United States Patent
Saffie-Siebert et al.

(10) Patent No.: US 12,496,278 B2
(45) Date of Patent: *Dec. 16, 2025

(54) DELIVERY SYSTEM COMPRISING SILICON NANOPARTICLES

(71) Applicant: SISAF LIMITED, Guildford (GB)

(72) Inventors: Roghieh Suzanne Saffie-Siebert, Guildford (GB); Paulina Malgorzata Baran-Rachwalska, Guildford (GB); Flavia Maria Sutera, Guildford (GB); Nasrollah Torabi-Pour, Guildford (GB)

(73) Assignee: SISAF LIMITED, Guildford (GB)

( * ) Notice: Subject to any disclaimer, the term of this patent is extended or adjusted under 35 U.S.C. 154(b) by 472 days.

This patent is subject to a terminal disclaimer.

(21) Appl. No.: 17/598,703

(22) PCT Filed: Mar. 30, 2020

(86) PCT No.: PCT/GB2020/050854
§ 371 (c)(1),
(2) Date: Sep. 27, 2021

(87) PCT Pub. No.: WO2020/193999
PCT Pub. Date: Oct. 1, 2020

(65) Prior Publication Data
US 2023/0052784 A1    Feb. 16, 2023

(30) Foreign Application Priority Data
Mar. 28, 2019   (GB) ..................................... 1904337

(51) Int. Cl.
*A61K 9/51* (2006.01)
*A61K 9/00* (2006.01)
(Continued)

(52) U.S. Cl.
CPC .......... *A61K 9/5115* (2013.01); *A61K 9/0048* (2013.01); *A61K 9/127* (2013.01);
(Continued)

(58) Field of Classification Search
CPC .... A61K 9/5115; A61K 9/0048; A61K 9/127; A61K 31/713; A61K 47/12; A61K 47/18;
(Continued)

(56) References Cited

U.S. PATENT DOCUMENTS 5,922,360 A    7/1999  Bronder
6,670,335 B2   12/2003 Singh et al.
(Continued)

FOREIGN PATENT DOCUMENTS

AU    774668 B2    4/2001
CA    3070107      1/2019
(Continued)

OTHER PUBLICATIONS

Cheang, Tuck-yun, et al. "Promising plasmid DNA vector based on APTES-modified silica nanoparticles." International journal of nanomedicine (2012): 1061-1067. (Year: 2012).*

(Continued)

*Primary Examiner* — Isaac Shomer
(74) *Attorney, Agent, or Firm* — Marian E. Fundytus; Amster Rothstein & Ebenstein LLP

(57) ABSTRACT

A composition for the controlled release of a nucleic acid such as short interfering RNA or messenger RNA, comprising silicon nanoparticles, at least one amino acid, and at least one lipid, wherein the silicon nanoparticles comprise at least 50% by weight silicon. Also related compositions and methods.

14 Claims, 13 Drawing Sheets

The effect of loading ratio on mRNA entrapment efficiency (EE%) expressed as the amount of bound mRNA as a percentage of total loaded

(51) Int. Cl.
  *A61K 9/127* (2025.01)
  *A61K 31/713* (2006.01)
  *A61K 47/12* (2006.01)
  *A61K 47/18* (2017.01)
  *A61K 47/24* (2006.01)
  *A61K 47/26* (2006.01)
  *A61P 27/02* (2006.01)

(52) U.S. Cl.
  CPC ............ *A61K 31/713* (2013.01); *A61K 47/12* (2013.01); *A61K 47/18* (2013.01); *A61K 47/183* (2013.01); *A61K 47/24* (2013.01); *A61K 47/26* (2013.01); *A61P 27/02* (2018.01)

(58) Field of Classification Search
  CPC ...... A61K 47/183; A61K 47/24; A61K 47/26; A61K 9/5123; A61P 27/02; C12N 2310/14; C12N 2320/32; C12N 15/111; C12N 15/87
  See application file for complete search history.

(56) References Cited

U.S. PATENT DOCUMENTS

| | | | |
|---|---|---|---|
| 8,992,984 | B1 | 3/2015 | Brinker et al. |
| 9,603,801 | B2 | 3/2017 | Barnett |
| 2007/0259013 | A1 | 11/2007 | Avram et al. |
| 2008/0153771 | A1* | 6/2008 | Liu .................... C12N 15/1138 514/44 A |
| 2009/0053268 | A1 | 2/2009 | Depablo et al. |
| 2009/0208556 | A1 | 8/2009 | Freeman |
| 2012/0128786 | A1* | 5/2012 | Saffie-Siebert .......... A61K 8/25 977/773 |
| 2014/0162938 | A1* | 6/2014 | Pereira .................... A61P 31/00 514/21.3 |
| 2015/0232883 | A1* | 8/2015 | Dahlman ............. C12N 15/907 435/320.1 |
| 2015/0272885 | A1* | 10/2015 | Ashley ................ A61K 49/0423 514/21.3 |
| 2016/0106091 | A1 | 4/2016 | Meunier et al. |
| 2017/0007531 | A1 | 1/2017 | Bastos et al. |
| 2017/0189550 | A1* | 7/2017 | Álvarez Puebla ...... A61P 35/00 |
| 2018/0193268 | A1* | 7/2018 | Sailor ..................... A61P 35/00 |
| 2018/0296696 | A1* | 10/2018 | Ruoslahti ........... A61K 47/6923 |
| 2018/0311336 | A1* | 11/2018 | Ciaramella ............ A61K 39/12 |
| 2018/0344641 | A1 | 12/2018 | Brinker et al. |

FOREIGN PATENT DOCUMENTS

| | | |
|---|---|---|
| CN | 104023711 A | 9/2014 |
| CN | 104127886 | 11/2014 |
| CN | 105434205 A | 3/2016 |
| CN | 106 177 982 A | 12/2016 |
| CN | 106265432 A | 1/2017 |
| CN | 107 616 952 A | 1/2018 |
| CN | 107 625 966 A | 1/2018 |
| CN | 107998264 A | 5/2018 |
| CN | 108552223 A | 9/2018 |
| CN | 101296625 A | 10/2018 |
| CN | 106806343 A | 6/2019 |
| EP | 0 272 091 A2 | 6/1988 |
| EP | 2 030 632 A1 | 3/2009 |
| EP | 2459156 | 11/2020 |
| JP | 2006016390 A | 1/2006 |
| JP | 2011032194 A | 2/2011 |
| WO | WO9749375 A1 | 12/1997 |
| WO | WO 02/067998 A1 | 9/2002 |
| WO | WO 2004/016551 A1 | 2/2004 |
| WO | WO 2006/050221 A2 | 5/2006 |
| WO | WO 2007/012847 A1 | 2/2007 |
| WO | WO2009005963 A2 | 1/2009 |
| WO | WO 2010/038064 | 4/2010 |
| WO | WO 2011/001456 | 1/2011 |
| WO | WO 2011/012867 | 2/2011 |
| WO | WO 2011/012867 A1 | 2/2011 |
| WO | WO 2013/056132 | 4/2013 |
| WO | WO 2014/165608 | 10/2014 |
| WO | WO 2017/008059 A1 | 1/2017 |
| WO | WO 2017/013250 | 1/2017 |
| WO | WO 2017/041032 | 3/2017 |
| WO | WO 2017/120537 | 7/2017 |
| WO | WO 2017/120537 A1 | 7/2017 |
| WO | WO-2017181115 A1 * | 10/2017 ............. A61K 47/62 |
| WO | WO2018029247 A1 | 2/2018 |
| WO | WO 2018/134222 | 7/2018 |
| WO | WO 2019/028387 | 2/2019 |

OTHER PUBLICATIONS

Birgit Scheel et al. "Therapeutic anti-tumor immunity triggered by injections of immunostimulating single-stranded RNA." European Journal of Immunology, vol. 36, 2006, pp. 2807-2816. (Year: 2006).*
Roggers R.A. et al., Molecular Pharmaceutics, 2012, vol. 9 "Chemically Reducible Lipid Bilayer Coated Mesoporous Silica Nanoparticles Demonstrating Controlled Release and HeLa and Normal Mouse Liver Cell Biocompatibility and Cellular Internalization", pp. 2770-2777.
Liu D et al., Advanced functional materials, 2013, vol. 23 No 15, "Nanostructured Porous Silicon-Solid Nanocomposite: Towards Enhanced Cytocompatibility and Stability, Reduced Cellular Association, and Prolonged Drug Release", pp. 1893-1902.
Examination report issued in GB Application No. GB1904336.3, mailed Aug. 1, 2019.
Examination report issued in GB Application No. GB1904334.8, mailed Aug. 12, 2019.
Examination report issued in GB Application No. GB1904337.1, mailed Aug. 1, 2019.
Examination report issued in GB Application No. GB1904338.9, mailed Aug. 8, 2019.
Extended European Search Report issued in Application No. 19165904.4, mailed Oct. 14, 2019.
Office Action issued in counterpart Chinese Application No. 202080025659.6 mailed Apr. 17, 2023, English Language translation thereof.
International Search Report issued in International Application No. PCT/GB2020/050854, mailed Jul. 7, 2020.
Written Opinion of the International Searching Authority issued in International Application No. PCT/GB2020/050854, mailed Jul. 7, 2020.
Office Action issued in Chinese Application No. 202080024934.2 mailed Oct. 25, 2023, English Language translation thereof.
Pluskota A, "In Caenorhabditis elegans Nanoparticle-Bio-Interactions Become Transparent: Silica-Nanoparticles Induce Reproductive Senescenc." PLoS ONE | www.plosone.org;Aug. 2009 | vol. 4 | Issue 8 | e6622.
Model Biotoxicology Based on Summaries and Reflections on Hidradenitis elegans Research, Dayong Wang, et al., Nanjing: Southeast University Press, pp. 153, publication date: Jan. 31, 2013).
Office Action issued in counterpart Japanese Application No. JP 2021-557827 mailed Nov. 21, 2023, English Language translation thereof.
Ruijin Zhao,et al. Beijing: Military Medical Science Press, "Oncology Health Education," Aug. 31, 2010, pp. 530-531.
Zhihua Wu, et al., Guangzhou: Guangdong Science and Technology Press, "Dermatologic Venereology: Textbook Edition," Jun. 30, 2013, p. 284.
Jinglong Cai, et al., Hangzhou: Zhejiang Science and Technology Publishing House, "Scar Plastic and Aesthetic Surgery" Mar. 31, 2015, p. 786.
Notice of Allowance issued in counterpart Chinese Application No. 202080025724.5 mailed Aug. 21, 2023, English Language translation thereof.
International Search Report issued in International Application No. PCT/GB2020/050850, mailed Jul. 15, 2020.

(56) References Cited

OTHER PUBLICATIONS

Written Opinion of the International Searching Authority issued in International Application No. PCT/GB2020/050850, mailed Jul. 15, 2020.
Saffie-Siebert R et al., Drug Discovery World 2005; 6: 71-6.
Saffie-Siebert, R et al., Pharmaceutical Technology Europe, 17(4), 21-28 (2005).
Luo, D., Saltzman, W. M., Gene Therapy (2006) 13, 585-586.
Ahola. M., Säilynoja, E.S., Raitavuo, M.H., Vaahtio, M.H., Salonen, J.I., Yli-Urpo, A.U.O., Biomat. (2001), 15, 2163-2170.
Lu, J., Liong, M., Zink, J., Tamanoi, F, Small. 2007, 3: 1341-1346.
Studies of the kinetics of the precipitation of uniform silica particles through the hydrolysis and condensation of silicon alkoxides, Journal of Colloid and Interface Science, vol. 142, Issue 1, Mar. 1, 1991, pp. 1-18 G.H Bogush and C.F Zukoski IV.
Communication Pursuant to Article 94 (3) EPC issued in counterpart application No. 20 718 722.0, mailed Aug. 8, 2022.
Communication Pursuant to Article 94 (3) EPC issued in counterpart application No. 20 718 724.6, mailed Aug. 8, 2022.
Communication Pursuant to Article 94 (3) EPC issued in counterpart application No. 20 718 725.3, mailed Jun. 29, 2022.
Communication Pursuant to Article 94 (3) EPC issued in counterpart application No. 20 718 723.8, mailed Jun. 29, 2022.
International Search Report issued in International Application No. PCT/GB2020/050849, mailed May 20, 2020.
Written Opinion of the International Searching Authority issued in International Application No. PCT/GB2020/050849, mailed May 20, 2020.
Juewen Liu et al: "Porous Nanoparticle Supported Lipid Bilayers (Protocells) as Delivery Vehicles", Journal of the American Chemical Society, vol. 131, No. 4, Feb. 4, 2009, pp. 1354-1355, XP055029872, ISSN:0002-7863,DOI: 10.1021.
International Search Report issued in International Application No. PCT/GB2020/050853, mailed Jul. 10, 2020.
Written Opinion of the International Searching Authority issued in International Application No. PCT/GB2020/050853, mailed Jul. 10, 2020.
Xie W, Hu L. Mesoporous SBA-15 Silica-supported Diisopropylguanidine: an Efficient Solid Catalyst for Interesterification of Soybean Oil with Methyl Octanoate or Methyl Decanoate. J Oleo Sci. Oct. 1, 2016;65(10):803-813. Epub Sep. 15, 2016.
U.S. Appl. No. 17/598,467, filed Sep. 27, 2021, published as US 2022-0183989-A1.
U.S. Appl. No. 17/598,536, filed Sep. 27, 2021, published as US 2022-0174952-A1.
U.S. Appl. No. 17/598,595, filed Sep. 27, 2021, published as 2022-0151944 A1.
U.S. Appl. No. 17/599,020, filed Sep. 27, 2021, published as US 2022-0184038-A1.
International Search Report issued in International Application No. PCT/GB2020/050851, mailed May 25, 2020.
Written Opinion of the International Searching Authority issued in International Application No. PCT/GB2020/050851, mailed May 25, 2020.
Lundstrom et al., Medicines, 2017, 4, 12.
Ramešová et al., Anal. Bioanal. Chem., 2016, 402, 975.
Ofice Action issued in counterpart Indian Application No. 202147045961 mailed Apr. 6, 2023.
Office Action issued in counterpart Chinese Application No. 202080025724.5 mailed Mar. 30, 2023, English Language translation thereof.
Yanan Liu, et al., "Effect of mesoporous silica nanoparticles on drug loading properties and drug release of flavonoids." Proprietary Chinese Medicines, Mar. 31, 2015, vol. 38, Issue 3, pp. 528-532.
V.V. Cotea et al., Mesoporous silica SBA-15, a new adsorbent for bioactive polyphenols from red wine Oct. 18, 2011, Analytica Chimica Acta, vol. 732, V.V., pp. 1-26.
Office Action issued in counterpart Chinese Application No. 202080025658.1 mailed Nov. 2, 2022 with English Language translation thereof.
Office Action issued in counterpart Chinese Application No. 202080025724.5 mailed Nov. 2, 2022 with English Language translation thereof.
Office Action issued in counterpart Chinese Application No. 202080025658.1 mailed Jun. 30, 2023, English Language translation thereof.
Examination Report issued in counterpart European Application No. 20 718 722.0 mailed Jul. 7, 2023.
Office Action issued in JP Application No. 2021-557824 mailed Jan. 30, 2024, English Language translation thereof.
Elizabeth A. Worrell, Aflaq Hamid, Karishma T. Mody, Neena Mitter and Hanu R. Pappu, "Nanotechnology for Plant Disease Management", Agronomy, 2018, 8, 285, 1-24. (Year: 2018).
Jasmina Kurepa, Timothy E. Shull and Jan A. Smalle, "Quercetin feeding protects plants against oxidative stress", F1000Research, 2016, 5:2430, 1-10. (Year: 2016).
Pan et al., Colloids and Surfaces B: Biointerfaces 159 (2017) 375-385.
Office Action issued in Chinese Application No. 202080023934.2 mailed Apr. 21, 2023, English Language translation thereof.
Ahola, M., Kortesuo, P., Kangasniemi, I., Kiesvaara, J., Yli-Urpo, A., Int. J. Pharm. 195 (2000) 219-227.
Pilkington, et al. (2021) From influenza to COVID-19: lipid nanoparticle mRNA vaccines at the frontiers of infectious diseases, Acta Biomaterialia, 131:16-40.
Bernard, et al (2023) The impact of nucleoside base modification in mRNA vaccine is influenced by the chemistry of its lipid nanoparticle delivery system. Molecular Therapy: Nucleic Acids, vol. 32, pp. 794-806.
Kim et al. (2022) Modifications of mRNA vaccine structural elements for improving mRNA stability and translation efficiency. Molecular & Cellular Toxicology, 18: 1-8.
Office Action issued in Australian Application No. 2020249810 mailed Oct. 4, 2024.

* cited by examiner

The effect of loading ratio on mRNA entrapment efficiency (EE%) expressed as the amount of bound mRNA as a percentage of total loaded

DELIVERY SYSTEM COMPRISING SILICON NANOPARTICLES

CROSS REFERENCE TO RELATED APPLICATIONS

The present application is a § 371 National Phase application based on PCT/GB2020/050854 filed Mar. 30, 2020, which claims the benefit of GB Application No. 1904337.1, filed Mar. 28, 2019, the subject matter of each of which is incorporated by reference in their entirety.

FIELD OF THE INVENTION

The present invention concerns delivery systems for the delivery of bioactive agents. More particularly, but not exclusively, this invention concerns the use of silicon nanoparticles for the delivery of short interfering RNA, messenger RNA or another nucleic acid. The invention also concerns related compositions.

BACKGROUND OF THE INVENTION

Due to its specificity, gene therapy has attracted considerable interest as a therapeutic approach for genetic diseases. Short interfering RNA (also known as small interfering RNA or siRNA), can be designed to target virtually any gene and has great potential to treat diseases. It is clear that siRNA technology has a great therapeutic potential in medicine. However, one of the major limitations for their application in vivo and in vitro is the inability of siRNA molecules to cross cell membranes and reach the cytoplasm. The negative charges arising from the phosphate groups in the siRNA backbone electrostatically repel negatively charged cell membranes, and therefore the ability of siRNA to diffuse across cell membranes. Delivery of siRNA across cell membranes is also hampered by its short in vitro half-life, due to efficient cellular and systemic defence mechanisms that degrade naked siRNA molecules. Other obstacles to the successful application of siRNA therapeutics in medicine exist, such as the high molecular weight of the siRNA, poor specificity and uptake in target tissues, cellular toxicity, and undesirable off-target effects. mRNA also shows promise as a therapeutic agent. mRNA has several advantages over DNA, including the lack of any requirement for nuclear localisation and the far lower risk of potentially damaging genomic integration. Whilst siRNA shows much potential in the treatment of disorders caused by gene over expression or inappropriate expression, mRNA has potential to be used for the treatment of disorders caused by gene under-expression. It also has potential for use in vaccines including anti-tumour vaccines. mRNA-based therapeutics face similar challenges to those of any therapeutic nucleic acid, namely challenges of delivery safety, specificity and efficiency.

RNA therapeutics (including siRNA and mRNA therapeutics) can also be applied in the treatment of eye disorders however, the intrinsic physical barriers, efficient drug clearance mechanisms and other complexities of ocular tissues pose a significant challenge to ocular RNA delivery. The ocular surface is one of the more complex biological barriers for drug delivery due to the combined effect of short contact time, the presence of tear solution and corneal cell penetration. One of the greater challenges to topical treatment of eye disorders is the structure of the cornea, which is adapted to form an effective barrier against fluid loss and pathogen penetration.

Though all tissues of the eye are accessible by injection, topical application would be preferable for the frequent treatment regimen required for siRNA-induced gene silencing and for mRNA-mediated treatment. Traditionally, drug delivery to the cornea is problematic because eye drops are rapidly drained via the tear ducts. The rapid drainage of tears, combined with the blink reflex, results in short pre-corneal residence times available for an active to be absorbed through the cornea. It has been estimated that 95% of an active compound contained in eye drop formulations is lost because it fails to cross the conjunctiva or is lost by drainage via the tear ducts. Despite the ocular protective mechanisms, topical formulations have shown a degree of success, though they still face challenges due to the barrier properties of the cornea.

Direct instillation of siRNA into the ocular surface has been used for the treatment of ocular surface and anterior segment disorders in vitro. However, topical ocular administration of any compound, including mRNA and siRNA, is limited by ocular anatomic constraints and physiological protective mechanisms. Several chemically-engineered siRNA therapeutics that have advanced to clinical trials are listed below, however the majority involve intravitreal injections:

SYL1001, Sylenthis S.A., Phase 1, 2 completed, Phase 3 ongoing—eye drops

SYL040012 (bamosiran), Sylenthis S.A., Phase 1, 2 completed—eye drops

Sirna-027 (AGN211745), Allergan, Phase 1, 2 completed—IVT injection

Bevasiranib (Cand5), OPKO Health Inc., Phase 2 completed—IVT injection

QPI-1007, Quark Pharmaceuticals, Phase 1 completed—IVT injection

PF-04523655, Quark Pharmaceuticals, Phase 1 completed—IVT injection

Since RNA-based therapies of eye diseases requires a frequent treatment regimen, the need for multiple injections increases the potential for cataract, retinal detachment, vitreous haemorrhage and endophthalmitis.

Other approaches to the delivery of RNA include eye injection formulations, which contain engineered viral particles. These particles are engineered to deliver the nucleic payloads to the eye. Such viral types (adenovirus, adenoassociated virus and lentivirus), have been investigated as vectors for RNAi therapy. Modified viral vectors, such as self-complementary AAV or helper-dependent adenovirus, are the current state-of-the-art in viral delivery. Several ophthalmology applications are currently under development. However, viral vectors suffer from disadvantages including: potential for mutagenesis, limited loading capacities, appropriate targeting, insertional predictability, high production costs, and adverse immune reactivity.

The delivery of plasmid vectors expressing mRNA or siRNA has been attempted with some success, but such DNA-based expression vectors can potentially integrate into the host genome and increase the chances of insertional mutagenesis. The advantage of engineered non-viral RNA delivery systems is that they are relatively safe and can be easily modified with targeting ligands. Moreover, the encapsulation of RNA into nano-carriers could be helpful for providing a form of sustained release of the RNA over extended periods of time and thus improve the treatment regimen.

Numerous non-viral carriers including natural and synthetic polymers, polyplexes, liposomes, lipoplexes, peptides, and dendrimeric nanomaterials have been proposed for RNA delivery. Although most of these strategies have been attempted with various degrees of success in vivo and in vitro, none have been used in clinical applications for RNA therapies of disorders or the eye and other tissues.

Though many types of polymers have been used to deliver oligonucleotides, much attention has focused on using cationic polymers due to their ability to electrostatically bind RNA without the need for covalent attachment or encapsulation, and the ability of amine functionalised cationic polymers to provide endosomal buffering and escape for intracytosolic RNA delivery. Numerous materials are under exploration however, the development of biodegradable nanocarriers for enhanced RNA delivery without causing safety concerns has been a challenge.

Despite the multitude of RNA delivery strategies available, the lack of safe and efficient delivery in vivo has limited the translation of RNA therapeutics in the clinic. A potent carrier system is required for RNA delivery that is able to effectively condense oligonucleotides, provide stability in physiological conditions, facilitate cellular uptake regardless of ocular barrier mechanisms and facilitate the release of RNA into the cytoplasm.

Thus, there remains a need for an effective, safe and non-invasive means of delivering siRNA and mRNA to body sites including but not limited to the cornea.

SUMMARY OF THE INVENTION

According to a first aspect of the invention, there is provided a composition for the controlled release of nucleic acid such as short interfering RNA or mRNA comprising silicon nanoparticles, at least one amino acid, and at least one lipid, wherein the silicon nanoparticles comprise at least 50% by weight silicon.

Advantageously, the presence of lipid in such compositions has a beneficial effect on the surface charge of the silicon nanoparticles, providing them with the requisite zeta potential to allow for improved loading of a nucleic acid such as siRNA or mRNA, and controlling the rate of nucleic acid release at a target site. The presence of the at least one lipid in the formulation also allows for the rate of hydrolysis of the silicon to be controlled, such that the silicon nanoparticle hydrolyses to the bioavailable orthosilicic acid (OSA) degradation product. In certain embodiments, the nucleic acid is RNA. In certain embodiments, the RNA is siRNA. In certain embodiments, the RNA is mRNA.

The composition further comprises at least one amino acid. Advantageously, the presence of amino acids in the composition has been found to affect the rate of release of nucleic acid conveyed by the silicon nanoparticle over time.

Preferably, the composition further comprises a transfection reagent.

According to a second aspect of the invention, there is provided a composition according the first aspect of the invention for use as a medicament.

According to a third aspect of the invention, there is provided a composition according to the first aspect of the invention, which is for ophthalmic delivery.

It will of course be appreciated that features described in relation to one aspect of the present invention may be incorporated into other aspects of the present invention. For example, the method of the invention may incorporate any of the features described with reference to the apparatus of the invention and vice versa.

DETAILED DESCRIPTION

Figure 1:
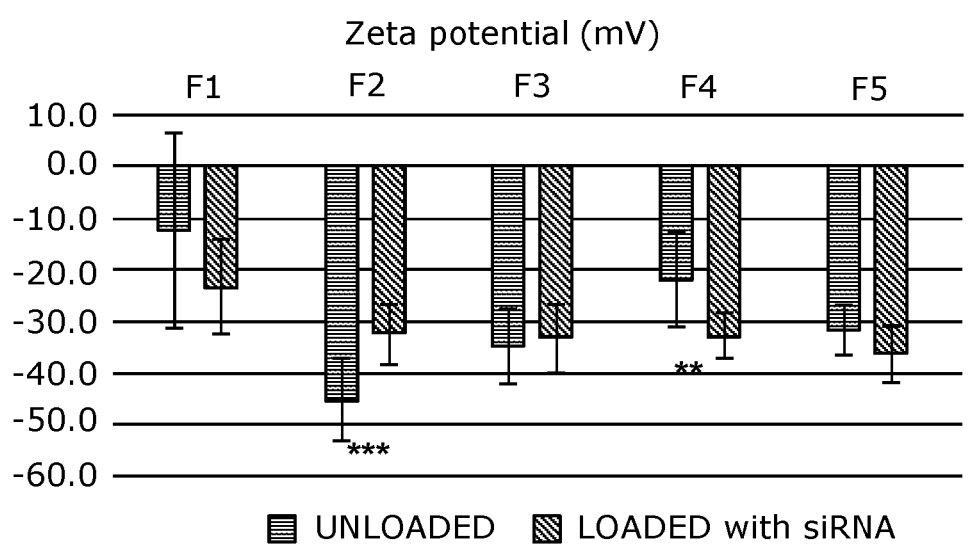
FIG. 1 shows a comparison of Zeta potentials of siRNA loaded and unloaded compositions of the invention. Each formulation is labelled F1 to F5.

According to a first aspect of the invention there is provided a composition for the controlled release of a nucleic acid such as siRNA or mRNA comprising silicon nanoparticles, at least one amino acid, and at least one lipid, wherein the silicon nanoparticles comprise at least 50% by weight silicon.

Definitions

According to the present disclosure, a derivative of a compound may be a compound having substantially the same structure, but having one or more substitutions. For example, one or more chemical groups may be added, deleted, or substituted for another group. In certain preferred embodiments, the derivative retains at least part of a pharmaceutical or cosmetic activity of the compound from which it is derived, for example at least 90%, 80%, 70%, 60%, 50%, 40%, 30%, 20% or 10% of an activity of the compound from which it is derived. In some embodiments, the derivative may exhibit increased pharmaceutical or cosmetic activity compared to the compound from which it is derived. For example, in the context of a peptide, a peptide derivative may encompass the peptide wherein one or more amino acid residues have been added, deleted or substituted for another amino acid residue. In the case of a substitution, the substitution may be a non-conservative substitution or a conservative substitution, preferably a conservative substitution.

In the context of the present disclosure, PC represents phosphatidylcholine; SA represents stearylamine; DOPE represents dioleoylphosphatidylethanolamine; and DC-cholesterol represents cholesteryl 3β-N-(dimethylaminoethyl) carbamate hydrochloride.

Silicon Nanoparticles

According to all aspects of the invention, the composition comprises silicon nanoparticles. They have a nominal diameter of between 5 and 400 nm, for example 50 to 350 nm, for example 80 to 310 nm, for example 100 to 250 nm, for example 120 to 240 nm, for example 150 to 220 nm, for example about 200 nm. They are made of either pure silicon or a hydrolysable silicon-containing material. They are preferably porous. The nominal diameter referred to above, may refer to the mean diameter and at least 90% of total particles in a sample of silicon nanoparticles may fall within the size range specified. They are made of either pure silicon or a hydrolysable silicon-containing material. Silicon nanoparticles can be made porous by standard techniques such as contacting the particles with a hydrofluoric acid (HF)/ ethanol mixture and applying a current. By varying the HF concentration and the current density and time of exposure, the density of pores and their size can be controlled and can be monitored by scanning electron micrography and/or nitrogen adsorption desorption volumetric isothermic measurement.

The silicon nanoparticles may be pure silicon or another hydrolysable silicon containing material. If they are not pure silicon, they contain at least 50% by weight silicon. For example, the silicon nanoparticles may contain at least 60, 70, 80, 90 or 95% silicon. The silicon nanoparticles preferably show a rate of hydrolysis (for example in PBS buffer at room temperature) of at least 10% of the rate of hydrolysis of pure silicon particles of the same dimensions. Assays for hydrolysis of silicon-containing material are widely known in the art, for example WO2011/001456.

Nanoparticles according to all aspects of the invention (for example, nanoparticles formulated with one or more of arginine, glycine and histidine, and/or one or more of PC, hydrogenated PC, SA, DOPE, DC-cholesterol, and derivatives thereof) are preferably porous. For example, their porosity may increase their surface area by a factor of at least 1.5, 2, 2.5, 3, 3.5 or 4 over the surface area of an equivalently sized non-porous material. In some embodiments (for example, when the nanoparticles are formulated with one or more of arginine, glycine and histidine, and/or one or more of PC, hydrogenated PC, SA, DOPE, DC-cholesterol, and derivatives thereof) their total surface area is preferably increased by virtue of their porosity by at least 50% or at least 100% over the surface area of a corresponding non-porous particle. In many circumstances porous silicon nanoparticles will in reality have a much greater increase in total surface area by virtue of their porosity.

Preferably (for example, when the nanoparticles are formulated with one or more of arginine, glycine and histidine, and/or one or more of PC, hydrogenated PC, SA, DOPE, DC-cholesterol, and derivatives thereof; such nanoparticles may be formulated for topical delivery, such as delivery to the skin surface or topical delivery to the eye) the silicon nanoparticles have an average diameter of between 2-300 nm, for example between 20-290 nm, between 20-280 nm, between 20-270 nm, between 20-260 nm, between 20-250 nm, between 20-240 nm, between 20-230 nm, between 20-220 nm, between 20-210 nm, especially between 20-200 nm. Advantageously, silicon nanoparticle of this size are ideal for skin delivery because they too small to block pilosebaceous ostra or sweat ducts (pores), but their small size allows the particles to actively penetrate to the bottom of the hair follicles rather than merely act as a surface drug reservoir.

Lipids

According to all aspects of the invention, (for example, when the nanoparticles are formulated with one or more of glycine, arginine and histidine) the silicon nanoparticles are surface treated with at least one lipid (for example, one or more of PC, hydrogenated PC, SA, DOPE, DC-cholesterol, and derivatives thereof; nanoparticles formulated in this manner may be suitable for ophthalmic delivery). It has been found that surface treating the silicon nanoparticle with a lipid aids in controlling the rate of release of a bioactive. Subject to the nature of the bioactive agent (for example, a nucleic acid such as siRNA or mRNA) the type of lipid used to treat the surface of the nanoparticle affects its rate of release. In particular, surface treating the silicon nanoparticle with a lipid has a beneficial effect on the surface charge of the silicon nanoparticles, providing them with the requisite zeta potential to allow for improved loading of short interfering RNA or messenger RNA, and controlling the rate of their release at a target site.

Silicon to Lipid Ratio

Preferably (for example, when the lipid is selected from one or more of PC, hydrogenated PC, SA, DOPE, DC-cholesterol, and derivatives thereof) the ratio of lipid to silicon is between 1:1 and 15:1, for example between 1:1 and 13:1, 1:1 and 12:1, 1:1 and 11:1, 1:1 and 10:1, 1:1 and 9:1, 1:1 and 8:1, 1:1 and 13:1, 2:1 and 12:1, 2:1 and 11:1, 2:1 and 10:1, 2:1 and 9:1, 2:1 and 8:1, for example between 1:1 and 7:1, between 2:1 and 7:1, between 3:1 and 6:1, between 4:1 and 5:1.

Advantageously, this ratio of lipid to silicon provides a multilamellar vesicle system able to control the release of, and stabilise, a bioactive agent conveyed by the silicon nanoparticle (for example, a nucleic acid such as siRNA or mRNA) and to facilitate the controlled the release of the bioavailable degradation product of the silicon, OSA.

Advantageously, the lipid compound can exert a significant effect on the surface charge of the silicon nanoparticles. Silicon nanoparticles treated with phosphatidylcholine (PC), phosphatidylethanolamine (PE) and lecithin demonstrated a negative surface charge when zeta potential analysis was performed (ranging from −60 to −20 mV, with ratios of silicon:Lipid ranging between 1:1 to 1:3). Silicon nanoparticles surface treated with stearylamine demonstrate a positive zeta potential (ranging from 0 to 40 mV, with ratios of silicon:lipid ranging from 1:1 to 1:3).

In one embodiment, the composition of the first aspect of the invention comprises silicon nanoparticles surface treated with at least 5% by weight lipid, for example at least 20 wt %, typically at least 30 wt % and especially at least 50 wt % lipid based on the total weight of the coated nanoparticle. It has been found that lipid to silicon molar ratios of between 0.8:1 and 3:1 are particularly advantageous, for example 1:1, 1.5:1, 2:1, or 2.5:1.

In certain embodiments (for example, when the nanoparticles are formulated with one or more of arginine, glycine and histidine, and/or one or more of PC, hydrogenated PC, SA, DOPE, DC-cholesterol, and derivatives thereof; such nanoparticles may be suitable for ophthalmic delivery) the composition of the first aspect of the invention comprises silicon nanoparticles surface treated with at least 5% by weight phospholipid, for example at least 20 wt %, typically at least 30 wt % and especially at least 50 wt % phospholipid based on the total weight of the coated nanoparticle. It has been found that lipid to silicon molar ratios of between 0.8:1 to 3:1 are particularly advantageous, for example 1:1, 1.5:1, 2:1, or 2.5:1.

In one embodiment, the phospholipid has a number average molecular weight in the range of from 500 to 1000. Particularly suitable phospholipids are glycerophospholipids. Particularly suitable phospholipids are those in which the polar head group is linked to quaternary ammonium moieties, such as phosphatidylcholine (PC) or hydrogenated phosphatidylcholine. The type of phospholipid may be selected depending on the nature of the formulation, with neutral or negatively charged lipids being preferred for aprotic formulations, while positively charged and small $CH_3$ chain lipids are preferred for protic formulations. Preferably, the side chain(s) is/are (an) aliphatic side chain(s) with 15 or more carbon atoms, or an ether side chain with 6 or more repeating ether units, such as a polyethylene glycol or polypropylene glycol chain.

Preferably (for example, in formulations comprising one or more of arginine, glycine and histidine; such formulations may be suitable for ophthalmic delivery) the lipid is selected from the group consisting of phosphatidylethanolamine (PE), phosphatidylcholine (PC), stearylamine (SA), lecithin, or any combination thereof.

In a further embodiment, the surface of the silicon nanoparticle can be treated with phosphatidylcholine, hydrogenated phosphatidylcholine, stearylamine, lecithin or combinations thereof. This may be especially advantageous if the siRNA/mRNA is charged.

In certain embodiments (for example, when the silicon nanoparticles of the invention are formulated with one or more of arginine, glycine and histidine, and/or one or more of PC, hydrogenated PC, SA, DOPE, DC-cholesterol, and derivatives thereof; such nanoparticles may be formulated for ophthalmic delivery) the composition of the first aspect of the invention comprises silicon nanoparticles surface treated with at least 5% by weight hydrogenated phosphatidylcholine, for example at least 20 wt %, typically at least 30 wt % and especially at least 50 wt % hydrogenated phosphatidylcholine based on the total weight of the coated nanoparticle. It has been found that hydrogenated phosphatidylcholine to silicon molar ratios of between 0.8:1 to 5:1 are particularly advantageous, for example 1:1, 1.5:1, 2:1, 2.5:1, 3:1, 3.5:1, 4:1, or 4.5:1.

In certain embodiments (for example, when the silicon nanoparticles of the invention are formulated with one or more of arginine, glycine and histidine; such nanoparticles may be formulated for ophthalmic delivery) the composition of the first aspect of the invention comprises silicon nanoparticles surface treated with at least 5% by weight phosphatidylcholine, for example at least 20 wt %, typically at least 30 wt % and especially at least 50 wt % phosphatidylcholine based on the total weight of the coated nanoparticle. It has been found that phosphatidylcholine to silicon molar ratios of between 0.8:1 to 5:1 are particularly advantageous, for example 1:1, 1.5:1, 2:1, 2.5:1, 3:1, 3.5:1, 4:1, or 4.5:1.

In certain embodiments (for example, when the silicon nanoparticles of the invention are formulated with one or more of arginine, glycine and histidine; such nanoparticles may be formulated for ophthalmic delivery) the composition of the first aspect of the invention comprises silicon nanoparticles surface treated with at least 5% by weight lecithin, for example at least 20 wt %, typically at least 30 wt % and especially at least 50 wt % lecithin based on the total weight of the coated nanoparticle. It has been found that lecithin to silicon molar ratios of between 0.8:1 to 3:1 are particularly advantageous, for example 1:1, 1.5:1, 2:1, or 2.5:1.

In certain embodiments (for example, when the silicon nanoparticles of the invention are formulated with one or more of arginine, glycine and histidine; such nanoparticles may be formulated for ophthalmic delivery) the composition of the first aspect of the invention comprises silicon nanoparticles surface treated with at least 5% by weight stearylamine, for example at least 20 wt %, typically at least 30 wt % and especially at least 50 wt % stearylamine based on the total weight of the coated nanoparticle. It has been found that lipid to silicon molar ratios of between 0.8:1 to 3.5:1 are particularly advantageous, for example 1:1, 1.5:1, 2:1, 2.5:1, 2:0.75, 2:1.5 or 3:1.

In certain embodiments (for example, when the silicon nanoparticles of the invention are formulated with one or more of arginine, glycine and histidine; such nanoparticles may be formulated for ophthalmic delivery) the composition of the first aspect of the invention comprises silicon nanoparticles surface treated with PC and SA, preferably in a ratio by weight of PC:SA of from 1:1 to 20:1, more preferably 7:1 to 10:1, such as a ratio by weight of PC:SA of 72:8.

In certain embodiments (for example, when the silicon nanoparticles of the invention are formulated with one or more of arginine, glycine and histidine; such nanoparticles may be formulated for ophthalmic delivery) the composition of the first aspect of the invention comprises silicon nanoparticles surface treated with DOPE, SA, and DC-cholesterol. The ratio by weight of DOPE:SA may be in a range of from 1:1 to 10:1, for example from 4:1 to 8:1. The ratio by weight of DOPE:DC-cholesterol may be in a range of from 1:1 to 5:1, for example from 1:1 to 3:1. The ratio by weight of SA:DC-cholesterol may be in a range of from 1:1 to 1:5, for example from 1:2 to 1:4. In some embodiments (for example, when the silicon nanoparticles of the invention are formulated with one or more of arginine, glycine and histidine; such nanoparticles may be formulated for ophthalmic delivery) the ratio by weight of DOPE:SA:DC-cholesterol may be 48:8:24.

Amino Acids

According to all aspects of the invention (for example, when the nanoparticles of the invention are formulated with one or more of PC, hydrogenated PC, SA, DOPE, DC-cholesterol, and derivatives thereof) the lipid treated silicon nanoparticles are further treated with an amino acid. In its broadest sense, the term "amino acid" encompasses any artificial or naturally occurring organic compound containing an amine ($-NH_2$) and carboxyl ($-COOH$) functional group. It includes an α, β, γ and δ amino acid. It includes an amino acid in any chiral configuration. According to some embodiments (for example, when the nanoparticles of the invention are formulated with one or more of PC, hydrogenated PC, SA, DOPE, DC-cholesterol, and derivatives thereof) the amino acid is preferably a naturally occurring a amino acid. It may be a proteinogenic amino acid or a non-proteinogenic amino acid (such as carnitine, levothyroxine, hydroxyproline, ornithine or citrulline). In preferred embodiments (for example, when the nanoparticles of the invention are formulated with one or more of PC, hydrogenated PC, SA, DOPE, DC-cholesterol, and derivatives thereof) the amino acid comprises arginine, histidine, or glycine or a mixture of arginine and glycine. In particularly preferred embodiments, the amino acid comprises glycine.

According to preferred embodiments (for example, when the nanoparticles are formulated with one or more of arginine, glycine and histidine, and/or one or more of PC, hydrogenated PC, SA, DOPE, DC-cholesterol, and derivatives thereof) at least 70%, for example at least 80%, for example at least 90% of the siRNA or mRNA by weight present in the products of all aspects of the invention is associated with the surface treated nanoparticles.

Molecular association between the nucleic acid such as siRNA or mRNA and the lipid-treated silicon nanoparticle advantageously ensures that the nucleic acid such as siRNA or mRNA becomes bio-available as the surface treated silicon nanoparticle (for example, a nanoparticle treated with one or more of PC, hydrogenated PC, SA, DOPE, DC-cholesterol, and derivatives thereof, and/or one or more of glycine, arginine and histidine) degrades. The rate of degradation of the composition is governed by the hydrolysis of the silicon nanoparticles. As this rate can be controlled, the rate at which the nucleic acid such as siRNA or mRNA becomes bio-available can also be controlled in order to avoid dose-dumping and/or to ensure release only when the nanoparticles have found their way to a location away from the site of application. For example, this may be when the nanoparticles have translocated from a skin surface to which they were applied to a basal location.

Treating the lipid-treated silicon nanoparticles (for example, nanoparticles treated with one or more of PC, hydrogenated PC, SA, DOPE, DC-cholesterol, and derivatives thereof) with an amino acid (for example, one or more of glycine, arginine and histidine, preferably glycine) has been found to provide a beneficial stabilising effect on a nucleic acid such as RNA (for example, mRNA or siRNA) loaded onto the silicon nanoparticles. In particular, treating the lipid-treated silicon nanoparticles with amino acids has be shown to stabilise the nucleic acid such as RNA in biological fluids, for example in ocular tissues. Lipid-treated silicon nanoparticles formulated with an amino acid in this manner may be particularly suitable for ophthalmic delivery, and may provide a delivery system for the ophthalmic delivery of nucleic acids (such as siRNA or mRNA).

According to certain embodiments of all aspects of the invention (for example, when the nanoparticles are formulated with one or more of PC, hydrogenated PC, SA, DOPE, DC-cholesterol, and derivatives thereof) the lipid-treated silicon nanoparticles are further treated with arginine, glycine or combinations thereof. Silicon nanoparticles which are surface treated with one or more of glycine and arginine, and which are loaded with a nucleic acid such as RNA, demonstrated better bioactive stability in biological fluids, and efficient delivery of a charged nucleic acid such as RNA, such as siRNA or mRNA, in ocular cells and cytoplasmic environments.

Ratio of Amino Acid to Silicon

Preferably (for example, when the silicon nanoparticles of the invention are formulated with one or more of arginine, histidine, and glycine, and/or one or more of PC, hydrogenated PC, SA, DOPE, DC-cholesterol, and derivatives thereof) the ratio of amino acid to silicon is between 0.05:1 and 2:1, for example between 0.05:1 and 1.8:1, 0.05:1 and 1.6:1, 0.05:1 and 1.4:1, 0.05:1 and 1.2:1, 0.05:1 and 1:1, 0.05:1 and 0.9:1, 0.05:1 and 0.8:1, 0.05:1 and 0.6:1, 0.05:1 and 0.5:1, 0.05:1 and 0.4:1, 0.05:1 and 0.3:1, 0.05:1 and 0.2:1, preferably between 0.2:1 and 0.8:1, especially between 0.3:1 and 0.7:1. Advantageously, this ratio of amino acid to silicon further affects the rate of release of, and stabilises, an RNA molecule conveyed by the silicon nanoparticle.

According to all aspects of the invention, the silicon nanoparticles (which may be formulated for ophthalmic delivery) are treated with a lipid (for example, one or more of PC, hydrogenated PC, SA, DOPE, DC-cholesterol, and derivatives thereof) and an amino acid (for example, one or more of glycine, arginine and histidine, such as glycine or a mixture of glycine and arginine). The amino acid may be any amino acid. Preferably the amino acid is arginine or glycine or a combination of glycine and arginine. The lipid can be any lipid. Preferably the lipid is a phospholipid. More preferably, it is selected from one or more of hydrogenated PC, PC, DOPE, lecithin, stearylamine, and derivatives thereof. Optionally, the lipid comprises DC-cholesterol and/or a derivative thereof. Preferably, the ratio of amino acid to silicon is between 0.05:1 to 0.4:1, for example between 0.08:1 and 0.35:1, especially 0.09:1 to 0.32:1. In some embodiments (for example, when the lipid is selected from one or more of PC, hydrogenated PC, SA, DOPE, DC-cholesterol, and derivatives thereof) the amino acid is a combination of arginine and glycine, wherein the ratio of Arg:Gly is between 1:0.6 and 3:1, for example between 1:0.8 and 2.5:1, for example between 1:1 and 2:1. Advantageously, such ratios have been found to provide a high rate of RNA release, as well as efficient delivery of RNA (such as siRNA or mRNA) in ocular cells and cytoplasmic environments. Thus, the lipid-treated silicon nanoparticles of the invention, formulated with an amino acid, may be particularly suitable for ophthalmic delivery, and may provide a delivery system for the ophthalmic delivery of nucleic acids (such as siRNA or mRNA).

According to other embodiments of all aspects of the invention (for example, when the nanoparticles of the invention are formulated for ophthalmic delivery) the lipid-treated silicon nanoparticles are treated with arginine. The lipid can be any lipid. Preferably, the lipid is selected from one or more of hydrogenated PC, PC, DOPE, lecithin, stearylamine, and derivatives thereof. Optionally, the lipid comprises DC-cholesterol and/or a derivative thereof. Preferably, the ratio of arginine to silicon is between 0.05:1 to 0.4:1, for example between 0.08:1 and 0.35:1, especially 0.09:1 to 0.32:1. Advantageously, such ratios have been found to provide a high rate of RNA release, as well as efficient delivery of RNA (such as siRNA or mRNA) in ocular cells and cytoplasmic environments. Thus, the lipid-treated silicon nanoparticles of the invention, formulated with an amino acid, may be particularly suitable for ophthalmic delivery, and may provide a delivery system for the ophthalmic delivery of nucleic acids (such as siRNA or mRNA).

According to other embodiments of all aspects of the invention (for example, when the nanoparticles are formulated for ophthalmic delivery) the lipid-treated silicon nanoparticles are treated with glycine. The lipid can be any lipid. Preferably, the lipid is selected from one or more of hydrogenated PC, PC, DOPE, lecithin, stearylamine, and derivatives thereof. Optionally, the lipid comprises DC-cholesterol and/or a derivative thereof. Preferably, the ratio of glycine to silicon is between 0.05:1 to 0.5:1, for example between 0.08:1 and 0.45:1, especially 0.09:1 to 0.42:1. Advantageously, such ratios have been found to provide a high rate of RNA release, efficient delivery of charged RNA such as siRNA and mRNA in ocular cells and cytoplasmic environments, and such ratios favour cell internalisation. Thus, the lipid-treated silicon nanoparticles of the invention, formulated with an amino acid, may be particularly suitable for ophthalmic delivery, and may provide a delivery system for the ophthalmic delivery of nucleic acids (such as siRNA or mRNA).

RNA

According to preferred embodiments of all aspects of the invention (for example, when the silicon nanoparticles of the invention are formulated with one or more of arginine, histidine, and glycine, and/or one or more of PC, hydrogenated PC, SA, DOPE, DC-cholesterol, and derivatives thereof; such formulations may be suitable for ophthalmic delivery) the lipid treated silicon nanoparticles are loaded with RNA, which may be siRNA or mRNA. In its broadest sense, the term "siRNA" encompasses small interfering RNA (siRNA), sometimes known as short interfering RNA or silencing RNA, and comprise double-stranded RNA molecules of 5 to 50 base pairs in length, and operate within the RNA interference (RNAi) pathway. For example 10 to 45 base pairs, 15 to 40 base pairs, of 20-30 base pairs, especially 20 to 25 base pairs in length. The term "mRNA" encompasses messenger RNA and may optionally include mRNA comprising a 5-prime cap and/or a poly-adenylated terminus. Alternatively, one of both of those features may be absent.

RNA according to preferred embodiments of all aspects of the invention (for example, when the silicon nanoparticles of the invention are formulated with one or more of arginine, histidine, and glycine, and/or one or more of PC, hydrogenated PC, SA, DOPE, DC-cholesterol, and derivatives thereof; such formulations may be suitable for ophthalmic delivery) may be naturally occurring or chemically modified to enhance their therapeutic properties, such as enhanced activity, increased serum stability, fewer off-targets and lower immunological activation. Chemical modifications to the RNA may include any modifications commonly known in the art.

According to certain embodiments (for example, when the silicon nanoparticles of the invention are formulated with one or more of arginine, histidine, and glycine, and/or one or more of PC, hydrogenated PC, SA, DOPE, DC-cholesterol, and derivatives thereof; such formulations may be suitable for ophthalmic delivery) the RNA is siRNA. According to other embodiments (for example, when the silicon nanoparticles of the invention are formulated with one or more of arginine, histidine, and glycine, and/or one or more of PC, hydrogenated PC, SA, DOPE, DC-cholesterol, and derivatives thereof; such formulations may be suitable for ophthalmic delivery) the RNA is mRNA.

According to other embodiments (for example, when the silicon nanoparticles of the invention are formulated with one or more of arginine, histidine, and glycine, and/or one or more of PC, hydrogenated PC, SA, DOPE, DC-cholesterol, and derivatives thereof; such formulations may be suitable for ophthalmic delivery) the nucleic acid is DNA or a DNA/RNA hybridization product.

Ratio of Silicon to Nucleic Acid

Preferably (for example, when the silicon nanoparticles of the invention are formulated with one or more of arginine, histidine, and glycine, and/or one or more of PC, hydrogenated PC, SA, DOPE, DC-cholesterol, and derivatives thereof; such formulations may be suitable for ophthalmic delivery) the ratio of silicon to nucleic acid (such as siRNA or mRNA) is between 1:1 and 8:1, for example between 1:1 and 6:1, 1:1 and 5:1, 1:1 and 4:1, or between 1:1 and 3:1. Preferably, the ratio of silicon to nucleic acid is between 1:1 and 3:1. Advantageously, this ratio of silicon to nucleic acid further affects the rate of release of, and stabilises, a nucleic acid molecule (such as an siRNA or mRNA molecule) conveyed by the silicon nanoparticle. Formulations having such ratios of silicon to nucleic acid may be particularly suitable for ophthalmic delivery, and may provide a delivery system for the delivery of nucleic acids to ocular tissues.

Further Components

Transfection Reagents

According to preferred embodiments of all aspects of the invention (for example, when the silicon nanoparticles of the invention are formulated with one or more of arginine, histidine, and glycine, and/or one or more of PC, hydrogenated PC, SA, DOPE, DC-cholesterol, and derivatives thereof; such formulations may be suitable for ophthalmic delivery) the lipid-treated silicon nanoparticle may be surface treated with transfection agents. In its broadest sense "transfection" is the process of deliberately introducing naked or purified nucleic acids into eukaryotic cells. Transfection may also refer to other methods and cell types. mRNA may be transfected into cells in order to achieve translation of their sequence. siRNAs can be transfected to achieve RNA silencing (i.e. loss of RNA and protein from the targeted gene).

In its broadest sense "transfection reagents" are agents that facilitate the introduction of naked or purified nucleic acids into eukaryotic cells. For example, some transfection reagents are agents that facilitate the induction of naked or purified siRNAs or mRNAs into eukaryotic cells.

According to other embodiments of all aspects of the invention (for example, when the silicon nanoparticles of the invention are formulated with one or more of arginine, histidine, and glycine, and/or one or more of PC, hydrogenated PC, SA, DOPE, DC-cholesterol, and derivatives thereof; such formulations may be suitable for ophthalmic delivery) the transfection reagents may be lipofection (liposome transfection) reagents, dendrimers, a HEPES-buffered saline solution (HeBS) containing phosphate ions combined with a calcium chloride solution, or cationic polymers such as diethylaminoethyl-dextran (DEAE-dextran) or polyethylenimine (PEI).

In preferred embodiments (for example, when the silicon nanoparticles of the invention are formulated with one or more of arginine, histidine, and glycine, and/or one or more of PC, hydrogenated PC, SA, DOPE, DC-cholesterol, and derivatives thereof) the transfection reagent is a lipofection reagent, for example a cationic lipid formulation, such as Lipofectamine™.

The nucleic acids such as the RNAs (such as siRNA or mRNA) for use in various aspects of the invention may be provided in various forms. For example, in some embodiments (for example, when the silicon nanoparticles of the invention are formulated with one or more of arginine, histidine, and glycine, and/or one or more of PC, hydrogenated PC, SA, DOPE, DC-cholesterol, and derivatives thereof) the nucleic acids such as RNAs are provided in solution (either alone or in combination with various other nucleic acids) in solution, for example buffer. In some embodiments (for example, when the silicon nanoparticles of the invention are formulated with one or more of arginine, histidine, and glycine, and/or one or more of PC, hydrogenated PC, SA, DOPE, DC-cholesterol, and derivatives thereof) nucleic acids such as RNAs are provided, either alone or in combination with other isolated nucleic acids, as a salt. In some embodiments (for example, when the silicon nanoparticles of the invention are formulated with one or more of arginine, histidine, and glycine, and/or one or more of PC, hydrogenated PC, SA, DOPE, DC-cholesterol, and derivatives thereof) nucleic acids such as RNAs are provided in a lyophilized form that can be reconstituted. For example, in some embodiments, the nucleic acids such as RNAs can be provided in a lyophilized pellet alone, or in a lyophilized pellet with other isolated nucleic acids. In some embodiments (for example, when the silicon nanoparticles of the invention are formulated with one or more of arginine, histidine, and glycine, and/or one or more of PC, hydrogenated PC, SA, DOPE, DC-cholesterol, and derivatives thereof) nucleic acids such as RNAs are provided affixed to a solid substance, such as a bead, a membrane, or the like. In some embodiments (for example, when the silicon nanoparticles of the invention are formulated with one or more of arginine, histidine, and glycine, and/or one or more of PC, hydrogenated PC, SA, DOPE, DC-cholesterol, and derivatives thereof) nucleic acids such as RNAs are provided in a host cell, for example a cell line carrying a plasmid, or a cell line carrying a stably integrated sequence.

Nucleic acids such as RNAs for use in accordance with the invention include double- and single-stranded DNA, RNA, DNA:RNA hybrids, and hybrids between PNAs (peptide nucleic acids) or RNA or DNA. The terms also include known types of modifications, for example, labels which are known in the art, methylation, "caps," substitution of one or more of the naturally occurring nucleotides with an analog, internucleotide modifications such as, for example, those with uncharged linkages (e.g., methyl phosphonates, phosphotriesters, phosphoramidates, carbamates, etc.), with negatively charged linkages (e.g., phosphorothioates, phosphorodithioates, etc.), and with positively charged linkages (e.g., aminoalkyphosphoramidates, aminoalkylphosphotriesters), those containing pendant moieties, such as, for example, proteins (including nucleases, toxins, antibodies, signal peptides, poly-L-lysine, etc.), those with intercalators (e.g., acridine, psoralen, etc.), those containing chelators (e.g., metals, radioactive metals, boron, oxidative metals, etc.), those containing alkylators, those with modified linkages (e.g., alpha anomeric nucleic acids, etc.), as well as unmodified forms of the polynucleotide or oligonucleotide.

It will be appreciated that, as used herein, the terms "nucleoside" and "nucleotide" will include those moieties which contain not only the known purine and pyrimidine bases, but also other heterocyclic bases which have been modified. Such modifications include methylated purines or pyrimidines, acylated purines or pyrimidines, or other heterocycles. Modified nucleosides or nucleotides will also include modifications on the sugar moiety, e.g., wherein one or more of the hydroxyl groups are replaced with a halogen, an aliphatic group, or are functionalized as ethers, amines, or the like. Other modifications to nucleotides or polynucleotides involve rearranging, appending, substituting for, or otherwise altering functional groups on the purine or pyrimidine base which form hydrogen bonds to a respective complementary pyrimidine or purine, e.g., isoguanine, isocysteine, and the like. In some embodiments, the oligonucleotides and/or probes include at least one, two, three or four modified nucleotides.

In some embodiments, the nucleic acids such as the RNAs disclosed herein include one or more universal bases. As used herein, the term "universal base" refers to a nucleotide analog that can hybridize to more than one nucleotide selected from A, U/T, C, and G. In some embodiments, the universal base can be selected from the group consisting of deoxyinosine, 3-ntiropyrrole, 4-nitroindole, 6-nitroindole, 5-nitroindole.

Preparation of Silicon Nanoparticles

The silicon nanoparticles relating to the invention may conveniently be prepared by techniques conventional in the art, for example by milling processes or by other known techniques for particle size reduction. The silicon-containing nanoparticles may be made from sodium silicate particles, colloidal silica or silicon wafer materials. Macro or micro scale particles are ground in a ball mill, a planetary ball mill, or other size reducing mechanism. The resulting particles may be air classified to recover nanoparticles. It is also possible to use plasma methods and laser ablation for the production of nanoparticles.

Porous particles may be prepared by methods conventional in the art, including the methods described herein.

Preparation of Creams and Gels

Creams and gels may be formulated simply by dispersing (i.e. mixing) the silicon nanoparticles of the invention with a cream or gel base. For example, the silicon nanoparticles may be stirred into a pharmaceutical cream base. In respect of a gel, the powder may be stirred into the gel matrix in powder form and then the gel may be hydrated, or the powder may be stirred into a pre-hydrated gel.

Ophthalmic Delivery

According to a third aspect of the invention, compositions according to the first aspect of the invention (for example, compositions formulated with one or more of arginine, histidine, and glycine, and/or one or more of PC, hydrogenated PC, SA, DOPE, DC-cholesterol, and derivatives thereof) are provided, which are for ophthalmic delivery.

Although all tissues of the eye are accessible by injection, topical application is preferred for the frequent treatment regimen that is necessary for siRNA-induced gene silencing treatment. However, the ocular surface is one of the more complex biological barriers for drug delivery due to the combined effect of short contact time, tear dilution and poor corneal cell penetration.

The composition of the present invention provides an effective, clinically safe and non-invasive means of delivering siRNA to the tissues of the eye, such as to one or more of the tissues of the fibrous layer, the vascular layer, and the retina. For example, the composition of the present invention provides an effective, clinically safe and non-invasive means of delivering siRNA to one or more tissues selected from the tissues of the cornea, sclera, iris, ciliary body, choroid, zonular fibres, lens capsule, lens nucleus, vitreous body, and retina.

The composition of the invention can entrap and stabilise active pharmaceutical agents, particularly nucleic acids such as siRNA and mRNA. In turn, the nanoparticles of the invention are capable of delivering these active pharmaceutical agents, such as nucleic acids (for example siRNA or mRNA) to the cells of the eye (for example, to one or more of the cells of the cornea, sclera, iris, ciliary body, choroid, zonular fibres, lens capsule, lens nucleus, vitreous body, and retina). Upon application of the composition to one or more of the tissues of the eye, ocular cells internalise the nanoparticles. This enables the active pharmaceutical agent, such as a nucleic acid (for example, siRNA or mRNA) to penetrate into ocular cells, ensuring controlled release of the nucleic acid at the target site.

The composition of the first aspect of the invention may be formulated for ophthalmic delivery. For example, the composition may be formulated with one or more ophthalmically compatible excipients. The composition may be used for the treatment of ophthalmic disorders. For example, the composition of the first aspect of the invention may be used for the treatment of macular degeneration, conjunctivitis, glaucoma, diabetic retinopathy, diabetic macular edema, keratoconus, cataracts, retinitis, and uveitis, particularly macular degeneration. Macular degeneration may include age-related macular degeneration.

The present invention also provides, in further aspects, methods and agents related to the composition of the first aspect of the invention. For example, a method is provided comprising delivering a composition according to the first aspect of the invention to one or more tissues of the eye (for example, to one or more tissues selected from the tissue of the cornea, sclera, iris, ciliary body, choroid, zonular fibres, lens capsule, lens nucleus, vitreous body, and retina) optionally in combination with one or more ophthalmically compatible excipients. A method is provided for treating an ophthalmic disorder, comprising delivering a composition according to the first aspect of the invention to one or more tissues of the eye, optionally in combination with one or more ophthalmically compatible excipients. For example, such a method may comprise treating macular degeneration, conjunctivitis, glaucoma, diabetic retinopathy, diabetic macular edema, keratoconus, cataracts, retinitis, or uveitis, particularly macular degeneration.

EXAMPLES

The invention may be further illustrated by the following non-limiting examples.
Materials
Silicon Preparation Single side polished P-type or N-type silicon wafers were purchased from Si-Mat, Germany. All cleaning and etching reagents were clean room grade. Etching silicon were prepared by anodically etching of p-type Si in a 1:1(v/v) pure ethanol and 10% aqueous HF acid for 2-10 min at an anodic current density of 80 mA/cm$^2$. After etching, the samples were rinsed with pure ethanol and dried under a stream of dry high-purity nitrogen prior to use.

Etched Silicon wafer, P+ or N− crushed using a milling ball and/or pestle & mortar. The fine powder sieved using Retsch branded sieve gauge 38 um and shaker as200. Uniform and selected sizes (20-100 um) is achieved by the aperture size of the sieve. The particles sizes were measured by the quantachrome system and PCS from Malvern instrument. Samples keep in the close container until further use.

NanoSilicon powder also obtained from Sigma and Hefel Kaier, China. The particle size measured by PCS and the size of the particles recorded (size was range between 20-100 nm) before subjected to the loading and etching. Silicon wafer was crushed using a milling ball, or using mortar and pestle. The fine powder was sieved using a Retsch branded sieve gauge 38 um and shaker as200 and uniform nanoparticles with desired size collected.
Activation of Silicon Nanoparticles 250 ml of ethanol and 500 mg of 100 nm diameter porous silicon nanoparticles were mixed and stirred using a magnet bar for 30 minutes. The solution was then centrifuged for 30 minutes at 3000 rpm. The supernatant was discarded and the nanoparticles washed in 5 ml of distilled water and transferred to a round bottomed flask. The contents of the flask were frozen (2 hours at −25° C.). The frozen nanoparticles were freeze-dried using a freeze dryer overnight. The resultant dry powder is activated nanoparticles.
Preparation of the Amine, Lipid, Lipofectamine-Loaded siRNA Nanoparticles.

Formulations SIS005-PS91 and SIS005-DS61 (with glycine) were both prepared by dissolving of thin film of liposomes-forming material in and aqueous suspension of silicon nanoparticles containing siRNA. The mixture was then triple freeze-thawed, and tested for transfection efficiency on HCES cells in vitro. In parallel, the SIS005-PDS1051 formula were tested after further modifications aimed to introduce more positive charge (as it was showed to have a negative zeta-potential) which is believed to be preferable for the siRNA delivery system for the cornea. For this purpose, the ratio of cationic lipid in the formulation was increased.

The colloidal stability was evaluated by the dynamic light scattering method in parallel to zeta-potential measurement both unloaded and loaded formulations. Also the encapsulation efficiency of siRNA was determined by spectrophotometric method. The efficiency of transfection (internalization into the cells) will be assessed in human corneal epithelial cells by flow cytometry followed by the dual luciferase assay which was performed to determine knockdown in vitro after treatment with siRNA-loaded formulations.

Procedure for Preparation of Formulation for Transfection (SI005-PS91, SI005-DS61, SI005-DSC613 etc)

The components of these and other formulations are shown in the table below.

| Formula | siRNA siLUC/ NSC4/ siGlo | SiNPs | lipids | glycine |
|---|---|---|---|---|
| SIS005-DS61G | 10 | 20 | 80 [68 DOPE + 12 SA] | 10 |
| SIS005-PS91G | 10 | 20 | 80 [72 PC + 8 SA] | 10 |
| SIS005-PDS1051G | 10 | 20 | 80 [50 PC + 25 DOPE + 5 SA] | 10 |
| SIS005-PDS1052G | 10 | 20 | 80 [48 PC + 23 DOPE + 9 SA] | 10 |
| SIS005-PDSC10514G | 10 | 20 | 80 [40 PC + 20 DOPE + 4 SA + 16 DC-Chol] | 10 |
| SIS005-DSC613G | 10 | 20 | 80 [48 DOPE + 8 SA + 24 DC-Chol] | 10 |

Materials

Silicon nanoparticles, nuclease-free water, chloroform lipids: stearylamine (SA), cat. 305391 (Sigma-Aldrich)

L-α-phospatidylcholine from egg yolk (PC), cat. 61755 (Sigma-Aldrich)

dioleoyl L-α-phosphaltitylethanolamine (DOPE), cat. P1223 (Sigma-Aldrich)

N-(2-dimethylaminoethyl)carbamate cholesterol (DC-Chol), cat. 92243 (Sigma-Aldrich)

100 μM (1.33 μg/μl) nonspecific NSC4 (customised siRNA duplex, Eurogentec)

100 μM (1.33 μg/μl) targeted siLUC (customised siRNA oligonucleotide duplex, Eurogentec)

100 μM (1.33 μg/μl) FAM-tagged siRNA (green siGlo, Dharmacon)

Equipment rotary evaporation system, vortex, bath sonicator, water bath, round bottom flasks, universal test tubes, Eppendorf tubes, micropipettes, freeze drier system, ZetaSizer, high speed centrifuge, NanoDrop spectrophotometer, fluorescence reader Procedure NB For fluorescent siRNA (siGlo) avoid light exposure during the procedure (e.g. cover flasks and tubes with aluminium foil)

PART A—Loading of siRNA to Silicon Nanoparticle/Lipid Composition

Step I=Prepare Component 1: SiRNA-SiNPs Mix

1. Prepare filtered silicon nanoparticles solution 0.2 mg/ml in nuclease-free water.
2. Aliquot (700 μl) the above solution into 8 Eppendorf microtubes so that each contain 140 μg of SiNPs.
3. To each aliquots add siRNA and glycine and adjust volume to 1.4 ml with nuclease-free water:

|  |  | siRNA |  |  | nuclease- |
| --- | --- | --- | --- | --- | --- |
| aliquot ID | SiNPs 0.2 mg/ml | non-specific 100 μM NSC4 | targeted 100 μM siLUC | fluorescent 100 μM siGlo | glycine 1 mg/ml | free water (up to 1.4 ml) |
| $1^{st}$ | 700 μl | 52.5 μl | — | — | 70 μl | 577.5 μl |
| $2^{nd}$ | 700 μl | — | 52.5 μl | — | 70 μl | 577.5 μl |
| $3^{rd}$ | 700 μl | — | — | 52.5 μl | 70 μl | 577.5 μl |
| $4^{th}$ | 700 μl | — | — | — | 70 μl | 630 μl |

4. Mix the tubes thoroughly and incubate samples 1 hr at room temperature with agitation.

Step II=Prepare Component 2: Lipid Film

1. Dissolve each lipid component (SA, PC, DOPE, DC-Chol) in chloroform to a concentration of 0.2 mg/ml.
2. Transfer the desired amount of each lipid into a small round bottom flask and mix thoroughly. Prepare each lipid mixture in 8 replicates (in 8 flasks):
   a. Lipid base DS61
      68 μg of DOPE (340 μl)
      12 μg of SA (60 μl)
   b. Lipid base PS91
      72 μg of PC (360 μl)
      8 μg of SA (40 μl)
   c. Lipid base DSC613
      48 μg of DOPE (240 μl)
      8 μg of SA (40 μl)
      24 μg of DC-Chol (120 μl)
   d. Lipid base PDS1051
      50 μg of PC (250 μl)
      25 μg of DOPE (125 μl)
      5 μg of SA (25 μl)
   e. Lipid base PDS1052
      48 μg of PC (240 μl)
      23 μg of DOPE (115 μl)
      9 μg of SA (45 μl)
   f. Lipid base PDSC10514
      40 μg of PC (200 μl)
      20 μg of DOPE (100 μl)
      4 μg of SA (20 μl)
      16 μg of DC-Chol (80 μl)
3. Carefully evaporate the solvent using rotary evaporation system to form a thin lipid film. Place the dried lipids under vacuum to remove residual solvent.

Step III=Encapsulation of siRNA-SiNP (Component 1) with Liposomes (Component 2)

1. Dissolve thin lipid film (from Step-II) with siRNA-loaded or empty Si-nanoparticles samples (from Step-I). To each flask containing lipid film (a, b, c, d, e, f) add 200 μl of either $1^{st}$, $2^{nd}$, $3^{rd}$ or $4^{th}$ silicon nanoparticle/siRNA mix in separate:

| SIS005-DS61G | SIS005-PS91G | SIS005-DSC613G | SIS005-PDS1051G | SIS005-PDS1052G | SIS005-PDSC10514G |
| --- | --- | --- | --- | --- | --- |
| a-$1^{st}$ | b-$1^{st}$ | c-$1^{st}$ | d-$1^{st}$ | e-$1^{st}$ | f-$1^{st}$ |
| a-$2^{nd}$ | b-$2^{nd}$ | c-$2^{nd}$ | d-$2^{nd}$ | e-$2^{nd}$ | f-$2^{nd}$ |
| a-$3^{rd}$ | b-$3^{rd}$ | c-$3^{rd}$ | d-$3^{rd}$ | e-$3^{rd}$ | f-$3^{rd}$ |
| a-$4^{th}$ | b-$4^{th}$ | c-$4^{th}$ | d-$4^{th}$ | e-$4^{th}$ | f-$4^{th}$ |

2. Adjust volume of solutions to 400 μl by adding 200 μl of nuclease-free water to each flask.
3. Cover each flask with Parafilm, mix the content thoroughly and incubate at RT for 1 hr.
4. Vortex to completely dissolve the lipid film. Put flasks to bath sonication for 15 sec to help dissolving the lipids.
5. Transfer all the content of each flask to Eppendorf microtubes in separate.
6. Place all tubes in the freezer (−20° C.) and keep them for at least 3 hours (or overnight).
7. Remove samples from the freezer and put them into 30° C. water bath for 10 min. Cool down at RT and vortex thoroughly.
8. Repeat freeze-thaw (step 5 and 6) two more times.
9. Keep all samples in the freezer (−20° C.) until assayed.
10. Each loaded sample contains [10 μg siRNA: 20 μg SiNP: 80 μg lipid base: 10 μg glycine] in 400 μl volume.

Part B—Characterization of Silicon-Nanoparticle/Lipid Formulations

Encapsulation Efficiency

The siRNA encapsulation efficiency was investigated by determination of encapsulation efficiency after separation of loaded particles from free (unbound) siRNA by high speed centrifugation.

1. Collect 50 μl of each sample to centrifugal microtube
2. Centrifuge all samples at 21,000 xg for 30 min.
3. Transfer 25 μl (upper half part) of supernatant from each sample to separate tubes (denote as S1) and store at 4° C. until assayed (avoid light exposure in case of siGlo-loaded samples).
4. Add 25 μl of 2% SDS to pellet samples (with remaining supernatant) to disrupt lipid bilayer and release bound siRNA.
5. Centrifuge the tubes again at 21,000 xg for 30 min and collect supernatant (denote as S2).
6. Measure absorbance (OD) at 260 nm of all supernatant S1 and S2 samples using NanoDrop spectrophotometer. For siGlo-loaded samples, measure fluorescence intensity (FI) in both S1 and S2 supernatant samples.
7. Calculate encapsulation efficiency (EE %):

$$EE\% = \left(1 - \left(\frac{2 \times OD_{S1}}{OD_{S1} + 2 \times OD_{S2}}\right)\right) \times 100\%$$

where $OD_{S1}$—Absorbance (260 nm) of supernatant S1 (after 1st centrifugation)
$OD_{S2}$—Absorbance (260 nm) of supernatant S2 (after 2nd centrifugation)
For siGlo-loaded samples use $FI_{S1}$ and $FI_{S2}$ instead of $OD_{S1}$ and $OD_{S2}$, respectively.

8. The concentration of siRNA in supernatant samples and the amount of siRNA entrapped by silicon nanoparticle formulation can be determined using siRNA calibration curve (as described previously).

Zetasizer Measurements

Figure 2:
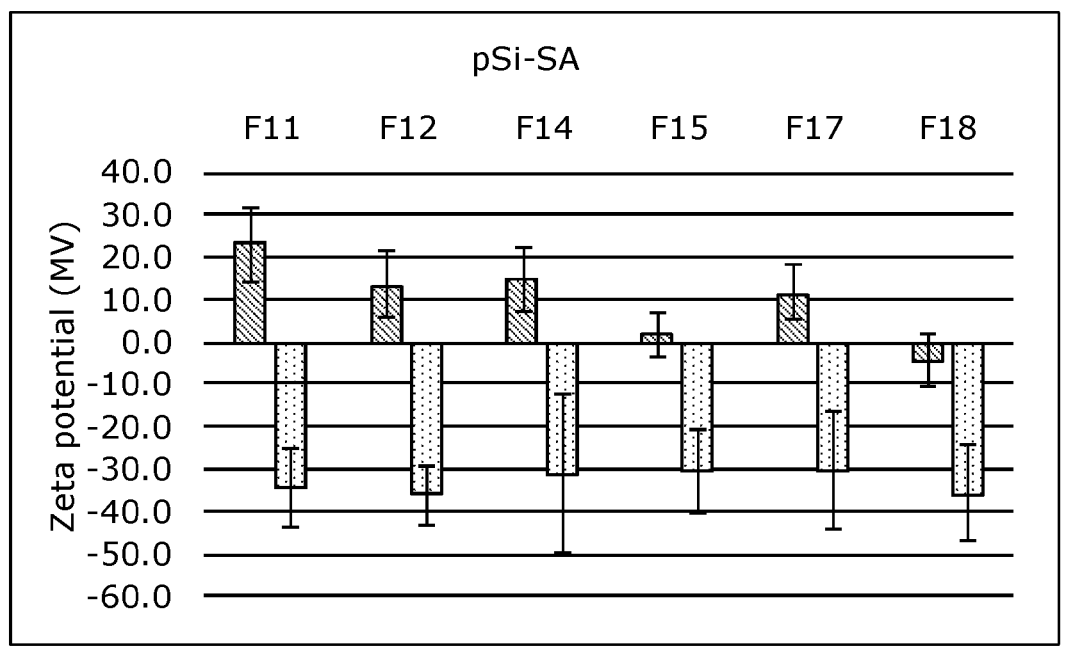
FIG. 2 shows a comparison of Zeta potentials of siRNA loaded and unloaded compositions of the invention where the silicon nanoparticle is surface treated with stearylamine (FIG. 2), PC (FIG. 3) or lecithin (FIG. 4), and the amine is arginine.
Figure 3:
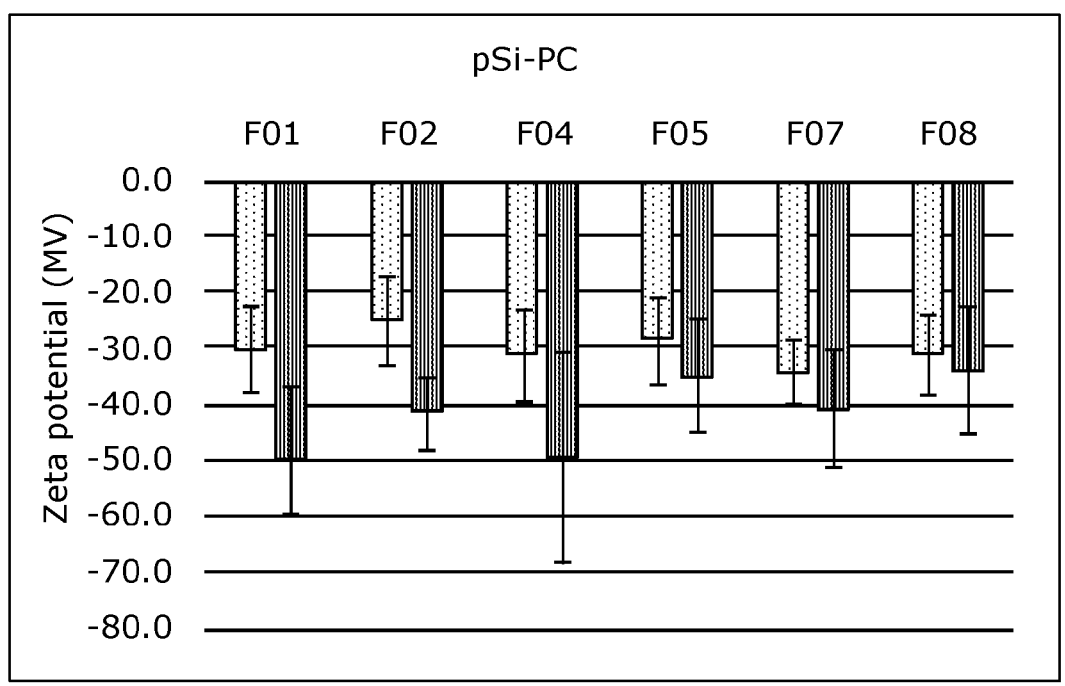
Figure 4:
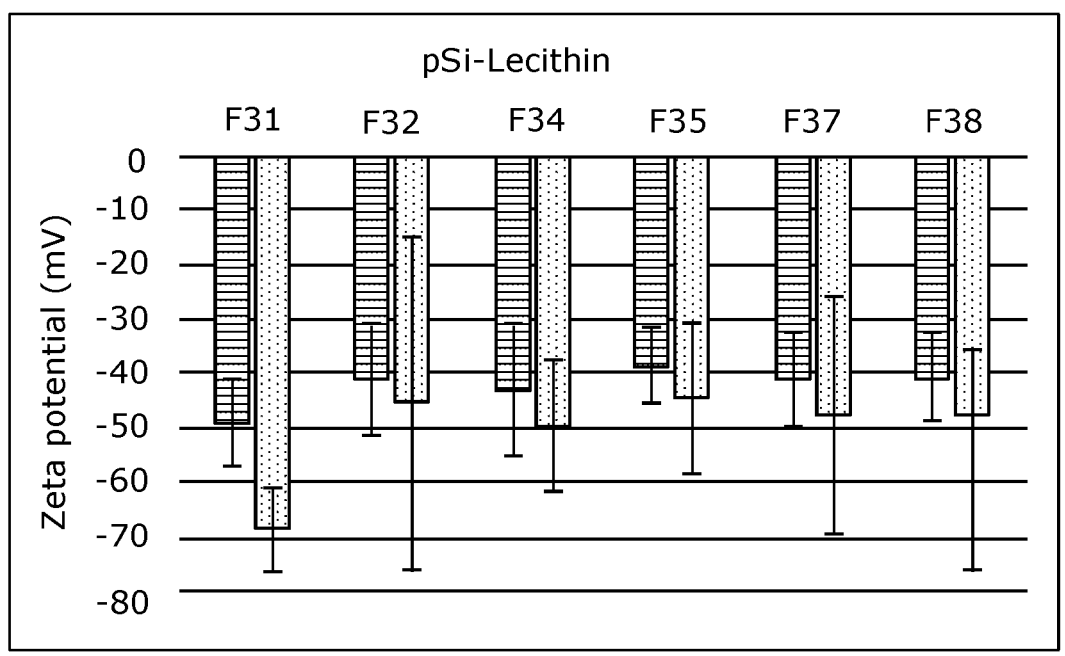
Figure 5:
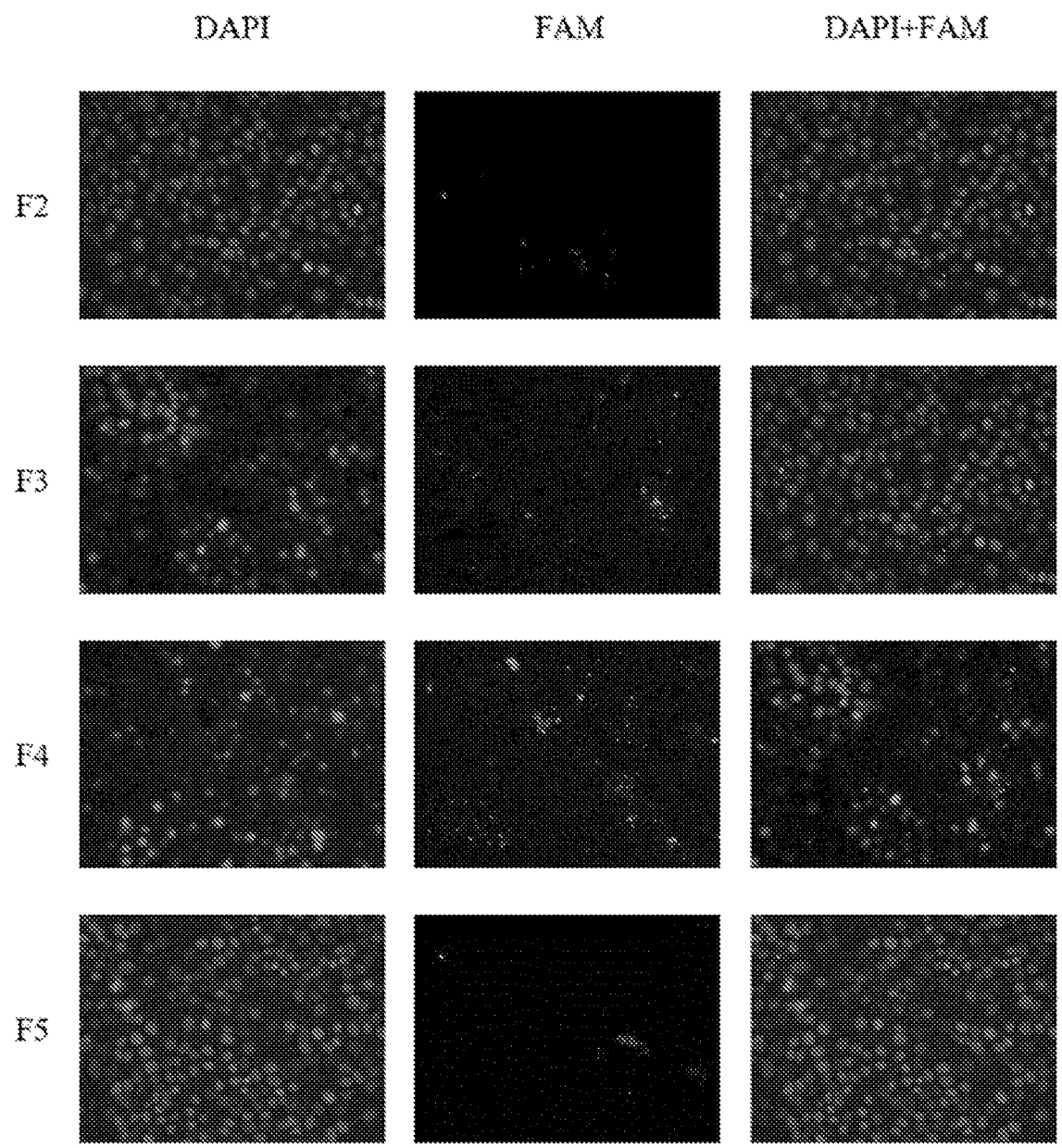
FIG. 5 shows the results of transfection efficiency of the compositions of the invention, in HCE cells. Cells of the first column are stained with DAPI and fluoresce in the original in blue showing the nucleus. Cells of the second column glow green in the original indicating successful transfection with formulations F2 to F5 of the invention.

The colloidal stability was evaluated by dynamic light scattering method in parallel to zeta-potential measurement. Perform measurements on unloaded (empty) formulation samples as well as loaded with siLUC/NSC4.
1. Collect 200 μl of each sample and dilute with nuclease-free ultrapure water to the total volume of 1 ml.
2. Load samples to folded capillary cells.
3. Read samples using ZetaSizer: particle dimensions, polydispersity index and zeta potential. Run each measurement in triplicate. Data is shown in FIGS. 1, 2 and 3.

Transfection Efficiency in HCES Cells

The efficiency of transfection (internalization into the cells) was assessed in human corneal epithelial cells by flow cytometry. For the purpose of this study, use formulation samples loaded with fluorescently tagged siRNA probe (siGlo).
1. Seed $2\times10^5$ HCES cells per well (on 12-well plate) in 1 ml of DMEM enriched with 10% FBS and grow 24 hours (until 80% confluency) at standard conditions.
2. Change medium for 950 μl per well of fresh DMEM enriched with 10% FBS.
3. Adjust siGlo-loaded silicon nanoparticle/lipid samples to room temperature.
4. Prepare control sample with Lipofectamine™ transfection reagent by mixing 6 μl of Lipofectamine™ RNAiMAX (a proprietary RNAi-specific cationic lipid formulation designed specifically for the delivery of siRNA and miRNA into all cell types) reagent with 3 μl of siGlo stock solution (100 μM) in 151 μl of Opti-MEM™ and incubate 15 min at room temperature.
5. Treat cells in 3 replicates by adding 53.3 μl of each siGlo-loaded formulation or LPF-control per well to obtain 0.1 μM siGlo concentration.
6. Grow cells for 24 hours at standard conditions (37° C. with 5% $CO_2$).
7. Discard medium and wash wells with 500 μl of PBS.
8. Add 300 μl of Trypsin-EDTA and incubate plates at 37° C. for 10 minutes.
9. Immediately add 300 μl of DMEM enriched with 10% FBS to stop trypsination.
10. Transfer the cells to microtubes in separate and centrifuge at 1000-2000 rpm for 5 min.
11. Discard supernatant and carefully suspend the cells in 500 μl of PBS.
12. Centrifuge samples at 1000-2000 rpm for 5 min.
13. Discard supernatant and carefully resuspend the cells in 600 μl of FACS buffer containing PI dye.
14. Analyse samples using flow cytometer.

Knockdown Efficiency

To determine the efficiency in knockdown induction, perform the dual luciferase assay with tested formulation samples loaded with specific (siLUC), non-specific (NSC4) and unloaded formulations.
1. Seed $6.5\times10^3$ HCES cells per well (on 96-well plate) in 100 μl of DMEM enriched with 10% FBS and grow 24 hours at standard conditions. Prepare 2 plates to study all formulation samples in 5 replicates each.
2. Transfect the cells with Renilla and Luc2p plasmids using Lipofectamine™ 2000 following the manufacturer's protocol. To each well add 50 μl of reagent mix containing 0.3 μl of Lipofectamine™ 2000, 1 ng of Renilla plasmid and 5 ng of Luc2p plasmid diluted in Opti-MEM™ medium to a total volume of 50 μl.
3. Grow the cells for 24 hours at 37° C. with 5% $Co_2$.
4. Change medium for 90 μl of fresh DMEM per well.
5. Adjust formulation samples to room temperature. Mix 32 μl of each sample with 28 μl of Opti-MEM™.
6. Prepare control samples with Lipofectamine™ transfection reagent:
   mix 1.2 μl of Lipofectamine™ RNAiMAX reagent with 55.8 μl of Opti-MEM™ and incubate 5 min at room temperature, then add 3 μl of siLUC stock solution and continue incubation for 10 min
   mix 1.2 μl of Lipofectamine™ RNAiMAX reagent with 55.8 μl of Opti-MEM™ and incubate 5 min at room temperature, then add 3 1 of NSC4 stock solution and continue incubation for 10 min
   mix 1.2 μl of Lipofectamine™ RNAiMAX reagent with 58.8 μl of Opti-MEM™ and incubate 15 min at room temperature
7. Treat cells in 5 replicates by adding 10 μl of loaded or empty formulation or LPF-control per well.
8. Grow cells at standard conditions (37° C. with 5% $CO_2$).
9. After 48 hours, discard medium and wash wells with PBS.
10. Add 20 μl of Passive Lysis Buffer per well.
11. Incubate plates at room temperature for 15 min on an orbital shaker (900 rpm).
12. Read the luminescence level using Dual-Luciferase Reporter Assay kit and the LUMIstar OPTIMA plate reader, following manufacturer's protocol.

Combining siRNA-Loaded Silicon Nanoparticles with Lipofectamine™ (SIS005-LPF)
1. Aliquot silicon nanoparticle suspension into 6 Eppendorf microtubes so that each contain 20 μg of SiNPs.
2. To above SiNP aliquots add 10 μg of siRNA:
   a. to 2 microtubes add 37 μl of 20 μM siLuc2p=targeted siRNA
   b. to 2 microtubes add 37 μl of 20 μM NSC4=non-specific siRNA
   c. unloaded control: leave the rest 2 microtubes containing SiNPs without siRNA, for preparing empty control
3. Incubate samples 1 hr at room temperature with agitation, then vortex and place the tubes in the freezer (−20° C.) and keep them for 2-3 hours.
4. Connect samples to freeze-dry system for overnight to evaporate water.
5. Prior further analysis, dissolve above siRNA-loaded (or unloaded control) SiNP samples in Lipofectamine™ solution (Lipofectamine™ RNAiMAX reagent, cat. 13778075, ThermoFisher Scientific) and dilute in nuclease-free water to a total volume of 150 μl, vortex and incubate at RT for 1 hr:

|  | Formula | siRNA | SiNPs | Lipofectamine |
| --- | --- | --- | --- | --- |
| targeted | SIS005-LPF1 | 10 μg siLuc2p | 20 μg SiNP | 15 μl Lipofectamine ™ |
| non-specific |  | 10 μg NSC4 | 20 μg SiNP | 15 μl Lipofectamine ™ |
| empty |  | — | 20 μg SiNP | 15 μl Lipofectamine ™ |
| targeted | SIS005-LPF2 | 10 μg siLuc2p | 20 μg SiNP | 30 μl Lipofectamine ™ |

-continued

| Formula | siRNA | SiNPs | Lipofectamine |
|---|---|---|---|
| non-specific | 10 μg NSC4 | 20 μg SiNP | 30 μl Lipofectamine ™ |
| empty | — | 20 μg SiNP | 30 μl Lipofectamine ™ |

Results Shown in FIG. 3

The changes of surface charge of silicon nanoparticles of the invention when loaded was evaluated. Usually the surface charge of particles decreases (shifts from more positive value to more negative) after binding negatively charged siRNA molecules on the surface. This effect was observed for almost a half of formulation samples tested, whereas the rest samples did not show any significant difference. The changes of ZP after loading with siRNA are presented in FIG. 3. Zeta potential of all samples containing PE were unaffected by siRNA loading. Similarly, most formulations with lecithin did not show significant differences of ZP. Only lecithin-Si-NP in ratio 75 μg:200 μg (F31) sample was shown to decrease surface charge when loaded with siRNA (p=0.0001). Also, for both PC-loaded nanoparticles (F01, F02) a significant decrease of ZP was observed after siRNA loading (p=0.0002 for 75 μg: 200 μg, and p=0.0005 for 150 μg:200 μg Si:PC ratio), as well as for PC-SiNP loaded also with arginine (F04, F07), regardless of amino acid content (p=0.0196 for 75 μg 200 μg:20 μg, and p=0.0490 for 75 μg:200 μg:40 μg Si:PC:Arg ratio).

The siRNA-loading had the greatest impact on surface charge of stearylamine surface treated silicon nanoparticles, inducing a high negative charge. As previous analysis showed, the empty Si-NP loaded with SA and SA+arginine had a positive or nearly neutral surface charge, therefore they attracted anionic siRNA molecules effectively.

The Effect of Loading Ratio on mRNA Entrapment Efficiency

Samples were prepared according to the protocol above for SIS005-DSC613G. Each sample comprised a ratio by weight of silicon nanoparticles:dioleoylphosphatidylethanolamine (DOPE):stearylamine:Cholesteryl 3β-N-(dimethylaminoethyl)carbamate hydrochloride (DC-cholesterol):glycine of 10:24:4:12:5. The samples were prepared at different ratios of nucleic acid to silicon nanoparticles, as shown in the table below.

ProSilic-DSC613G Formulation Samples with Varied mRNA Loading Ratio

| | Loading ratio tested (wt/wt) | | |
|---|---|---|---|
| Sample | silicon nanoparticles to mRNA | all other components to mRNA * | Charge ratio** N/P |
| unloaded U$_0$ (control) | 0:1 | 0:1 | 0 |
| loaded L$_{0.5}$ | 0.5:1 | 2.75:1 | ~0.625 |
| loaded L$_1$ | 1:1 | 5.5:1 | ~1.25 |
| loaded L$_2$ | 2:1 | 11:1 | ~2.5 |
| loaded L$_3$ | 3:1 | 16.5:1 | ~3.75 |
| loaded L$_4$ | 4:1 | 22:1 | ~5 |
| loaded L$_5$ | 5:1 | 27.5:1 | ~6.25 |
| loaded L$_6$ | 6:1 | 33:1 | ~7.5 |
| loaded L$_8$ | 8:1 | 44:1 | ~10 |

* This is the ratio by weight of all other components (silicon nanoparticles, lipids and amino acid) to mRNA.
**The approximate charge ratio (known as N/P ratio) is calculated based on the length of the mRNA, the average molecular mass of the RNA (circa 325 Da) and the molecular weight of the cationic lipids (stearylamine: 269.5 Da; DC-cholesterol: 500.8 Da).

* This is the ratio by weight of all other components (silicon nanoparticles, lipids and amino acid) to mRNA.

** The approximate charge ratio (known as N/P ratio) is calculated based on the length of the mRNA, the average molecular mass of the RNA (circa 325 Da) and the molecular weight of the cationic lipids (stearylamine: 269.5 Da; DC-cholesterol: 500.8 Da).

Evaluation of Entrapment of mRNA by Silicon Nanoparticle Formulations Using Gel Electrophoresis The effect of the loading ratio of silicon nanoparticles to mRNA on mRNA entrapment efficiency was investigated by gel electrophoresis. 1% E-Gel EX pre-cast agarose gel was used. The gel was visualized using the Gel Logic 100 Imaging System (Kodak). The results are shown in FIG. 6.

Figure 6:
FIG. 6 shows the result of a gel electrophoresis experiment, indicating that silicon nanoparticles prepared according to the invention successfully entrap mRNA, particularly at ratios of silicon nanoparticles to mRNA of 2:1 or higher (for example at ratios in a range of from 2:1 to 8:1).

FIG. 6 shows unloaded mRNA (U0) in line 1. Silicon nanoparticles loaded with mRNA (L0.5, L1, L2, L3, L4, L5, L6, L8) are in lines 2 to 9, in order of increasing ratio of silicon nanoparticles to mRNA, from left to right. An equal amount of mRNA (100 ng) was loaded into each of lines 1 to 9. Invitrogen E-Gel 1 Kb Plus Express DNA Ladder (80 ng) was loaded in line M as a marker. Line 10 was left empty (as a water blank).

Electrophoresis demonstrated that the SIS005-DSC613G formulation of the present invention successfully entraps mRNA, and does so particularly well at higher ratios of silicon nanoparticles to mRNA, such as ratios above 2:1. The control lane (unloaded mRNA, U0) in FIG. 6 shows a single fast-moving band as expected. The band was also visible in line 2 (loaded L0.5) and line 3 (loaded L1). This visible band corresponds to unbound mRNA. The intensity of bands in lines 2 and 3 (particularly in line 3) was lower compared to the control (U0). This indicates that even in samples with a very low ratio of silicon nanoparticles to mRNA, some mRNA is still entrapped by the silicon nanoparticles and is therefore not visible in the band.

Efficiently entrapped mRNA is unable to move through the gel pores and remains in the well (such that no band appears, unlike U0, L0.5 and L1). FIG. 6 shows that samples L2 to L8, with an increased content of silicon nanoparticles compared to lines 1 to 3, successfully entrap mRNA. This is evidenced by the absence of the band seen for U0, L0.5 and L1. This demonstrates that the silicon nanoparticle formulations of the invention are able to successfully entrap mRNA. The results suggest that the optimum loading ratio (the ratio having the greatest entrapment of mRNA, whilst minimising the amount of nanoparticles that are used) is L2, corresponding to ratios of 2:1 (silicon nanoparticles:mRNA) and 11:1 (all other components of the delivery system:mRNA). The same loading ratio has been found to be effective for siRNA loading. This ratio corresponds to an N/P charge ratio of approximately 2.5.

Evaluation of Entrapment Efficiency Using Spectrophotometry

To estimate the efficiency (EE, expressed as a percentage) of mRNA entrapment, the SIS005-DSC613G samples (U0 to L8) were also centrifuged to separate unbound mRNA.

The nucleic acid content in the supernatant fluid was measured by spectrophotometry, and the entrapment efficiency was calculated using the following equation:

$$EE\% = \frac{OD_{unloaded} - OD_{loaded}}{OD_{unloaded}} \times 100\%$$

$OD_{unloaded}$ is the absorbance for the unloaded mRNA control (U0). $OD_{loaded}$ is the absorbance for each sample L0.5 to L8.

Figure 7:
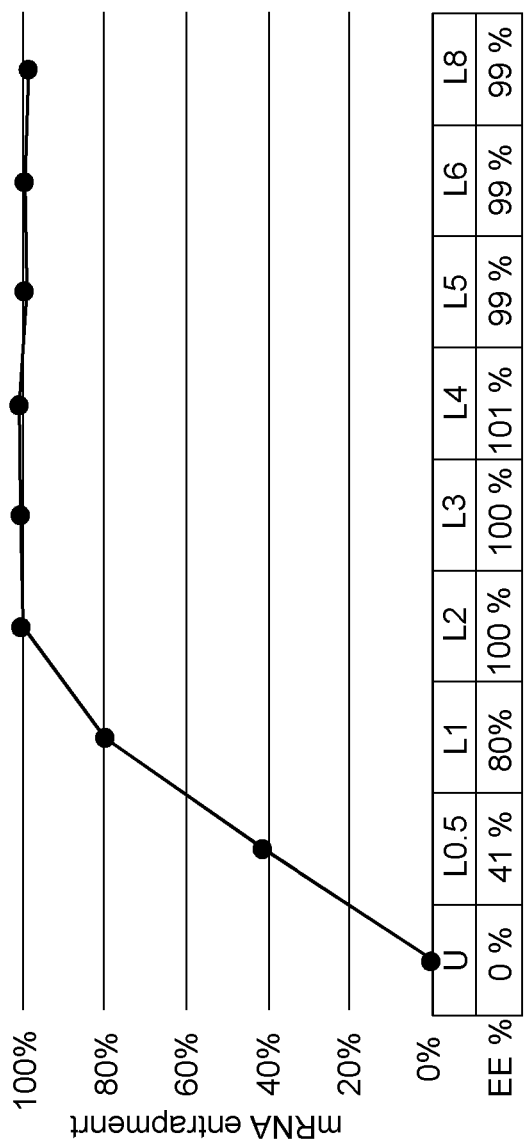
FIG. 7 shows the result of a spectrophotometry experiment, confirming that silicon nanoparticles prepared according to the invention successfully entrap mRNA, particularly at ratios of silicon nanoparticles to mRNA of 2:1 or higher (for example at ratios in a range of from 2:1 to 8:1).

The results are shown in FIG. 7, which confirms the results of the gel electrophoresis experiment. As the ratio of silicon nanoparticles to mRNA increases, the entrapment efficiency increases until it reaches a plateau, levelling off at ratios of silicon to mRNA of greater than 2:1.

Evaluating the Activity of Silicon Nanoparticle Formulations In Vivo

Samples were prepared according to the protocols for SIS005-PS91G and SIS005-DSC613G above. These samples comprise siRNA, silicon nanoparticles, lipids and glycine in the following ratios by weight:

| Sample | siRNA siLUC/ NSC4/ siGlo | silicon nanoparticles | lipids | glycine |
|---|---|---|---|---|
| SIS005-PS91G | 10 | 20 | 80 (72 PC + 8 SA) | 10 |
| SIS005-DSC613G | 10 | 20 | 80 (48 DOPE + 8 SA + 24 DC-Chol) | 10 |

SA is stearylamine, DOPE is dioleoylphosphateidylethanolamine, PC is phosphatidylcholine and DC-Chol is Cholesteryl 3β-N-(dimethylaminoethyl)carbamate hydrochloride.

SA is stearylamine, DOPE is dioleoylphosphatidylethanolamine, PC is phosphatidylcholine and DC-Chol is Cholesteryl 3ρ3-N-(dimethylaminoethyl)carbamate hydrochloride.

Preparation of siRNA-Loaded Silicon Nanoparticle Formulations

Samples comprising specific siRNA (siLUC) and non-specific siRNA (NSC4) were prepared. Both siRNAs (siLUC and NSC4) were designed as 21-mers with a central 19 bp duplex region and symmetric dTdT dinucleotide overhangs on each 3' end. The siRNAs were provided by Eurogentec (Belgium).

To prepare the samples, siRNA dissolved in nuclease-free water was added to an aqueous solution of the nanoparticles and incubated at room temperature for 60 minutes. A ratio of silicon nanoparticles to mRNA of 2:1 was used (as this had been found to be the optimum ratio in gel electrophoresis and spectrophotometry experiments, see above).

Live Animal Imaging

Animals were used for the following experiments in accordance with the UK Animal Welfare Act, with ethical approval by the Home Office (Scotland) and the Department of Health, Social Services and Public Safety (Northern Ireland). The experiments to assess delivery of fluorescent siRNA (DY-547-labeled siGLO, Dharmacon, UK) to the cornea were performed on wild-type C57BL/6 mice. To assess siRNA bioavailability and silencing activity of formulations, a reporter knock-in mouse line (Krt12+/luc2) was used, with the expression of Firefly luciferase specifically in the cornea epithelium (under the control of the endogenous Krt12 promoter). This animal model was developed on a C57BL/6 background as previously reported and provides a reliable model for in vivo evaluation of siRNA delivery methods using reporter gene expression monitoring. For in vivo imaging, mice were anaesthetized using 1.5-2% isoflurane (Abbott Laboratories Ltd., UK) in a circa 1.5 L/min flow of oxygen. Fluorescence of siGlo was detected with a Xenogen IVIS Spectrum with LivingImage 3.2 software (both Perkin Elmer, UK) using DsRed filter combination (excitation 535 nm, emission 570 nm) at determined time points following topical application. To measure luciferase reporter gene expression, luciferin (30 mg/mL D-luciferin potassium salt; Gold Biotechnology, USA) mixed 1:1 w/w with Viscotears gel (Novartis, UK) was dropped onto the eye of anaesthetized mouse immediately prior to imaging. Bioluminescence readouts were taken by IVIS Spectrum over a period of approximately 10 min and quantified using LivingImage software after ensuring the signal remained stable within an acquisition time. For signal intensity quantification, a region of interest (ROI) was selected separately for each eye keeping ROI parameters (size and shape) constant throughout experiments. Values are expressed as the right/left eye ratio (RE/LE) using split body control measurement regime.

In vivo siRNA Treatment

Experiments were performed using a split body control by comparing the treatment under a test, in one eye, with a negative control in the other eye of the same animal. During treatment, mice were anesthetized as described above. Silicon nanoparticle formulations containing 25 μM siRNA, complexed at a ratio by weight of 2:1 SiNPs-to-mRNA, were prepared and applied topically as a drop to the intact cornea in a total volume of 4 μL per eye. After application, the mouse was kept anesthetized for a further 15 min to allow absorption and maximize uptake. Following treatment, fluorescence and luminescence experiments were performed as described below.

Assessment of siRNA Penetration to the Cornea

To investigate delivery of siRNA to the cornea, an in vivo fluorescence study was performed on wild-type mice using eye drops containing siGlo. The fluorescent siRNA-silicon nanoparticle formulation was applied on top of the right eye, while the same amount of naked siGlo was applied topically to the left eye of each mouse as a control. Fluorescence live imaging was acquired with IVIS Spectrum at 15 min (i.e. immediately after treatment procedure) and 3, 6, and 24 h following siGlo application, and signal intensity was normalized to background fluorescence measured prior treatment (i.e. untreated eyes) and quantified as described earlier. After measurements taken at either 3 h or 24 h, the mice were sacrificed, and the eyes were enucleated, fixed in 4% paraformaldehyde in PBS for 30 min at room temperature, submerged in PolyFreeze (Sigma-Aldrich, UK), and immediately frozen at −80° C. Five-micrometer sections were cut using a cryostat (CM 1850, Leica), mounted on APES-coated slides (3-aminopropyltriethoxysilane, Sigma Aldrich, UK) with DAPI-containing mounting medium (DAPI I, Vysis, USA) and fluorescence was visualized with Axio-Scope A1 microscope equipped with a 20×/40× N Archoplan lens on an AxioCam MRc camera (Carl Zeiss, Germany).

Assessment of siRNA-Mediated Gene Silencing

Luciferase reporter mice (n=7) were used to determine the bioavailability of siRNA in the cornea after topical delivery with the silicon nanoparticles of the invention. In a split body control experiment, luciferase-targeting siLuc complexed with the silicon nanoparticle formulation was applied topically as a drop to the intact cornea of right eye (RE) in anesthetized mice, whereas the left eye (LE) was treated accordingly with NSC4 complexed with the silicon nanoparticle formulation, as negative control. Treatment was repeated daily for 8 consecutive days, with in vivo ocular luminescence measurements taken approximately 4-5 hours later. The effect of treatment on luciferase reporter gene expression was determined by measurement of luciferase bioluminescent activity (as described above) daily throughout the treatment regimen, and for a further 8 days after cessation of treatment for monitoring a wash-out period. Baseline luminescence was defined for each experimental animal by monitoring ocular luciferase activity at 24-hour intervals for 4 days prior to treatment. The relative RE/LE luciferase bioluminescent activity was quantified using the IVIS LivingImage software and plotted as an average value ±standard deviation.

Statistical Analysis

Data are presented as the means±standard deviation and are representative for at least 3 independent measurements, unless stated otherwise. Statistical significance was assessed with a one or two-way ANOVA followed by the Tukey's HSD post hoc test at 95% confidence level. For in vitro dual luciferase assay, a two-tailed Student's t test was performed for each formulation separately to analyze knockdown level (siLuc vs NSC4 control). For the in vivo luciferase experiment, the statistical analysis was done by comparing the average right/left ratio for all seven mice in the first 4 days before the beginning of the treatment (set as baseline) with the R/L ratios measured on the following days. Statistical analysis was performed using GraphPad Prism software (GraphPad Software, USA).

Results

Characteristics of the Silicon-Based siRNA Delivery System

Two variants of the silicon nanoparticle delivery systems of the invention (SIS005-PS91G and SIS005-DSC613G) were formulated through surface functionalization of silicon with cationic lipids commonly used in nucleic acid delivery, stearylamine and DC-cholesterol, which resulted in hybrid particles with similar hydrodynamic sizes of circa 350 nm and comparative positive zeta potential values. Complexation of cationic silicon nanoparticle formulations with siRNA studied by gel electrophoresis showed full entrapment of nucleic acid with a minimum SiNP-siRNA w/w ratio of 2:1. The percentage of complexed siRNA for varying w/w ratios was determined by spectrophotometry and calculated from the differences of siRNA amount added to the carrier and the concentration of siRNA in solutions after particle separation. Higher siRNA entrapment efficiency was observed for complexation with nanoparticles containing cationic cholesterol derivative compared to particles functionalized with stearylamine. However, both variants showed siRNA loading capacity in a range of 13-48 nmol per 1 mg of silicon nanoparticles. Following the siRNA loading studies above, a fixed SiNP/siRNA ratio of 2:1 was chosen for all further experiments.

As the physicochemical properties of nanoparticles play an important role in drug delivery, the particle size and surface charge of siRNA-loaded complexes were determined. SIS005-DSC613G did not show significant differences in dimensions and zeta potential when empty and loaded carrier were compared, whereas SIS005-PS91G showed an increased mean particle size and negative surface charge when complexed with siRNA, suggesting an absorption of nucleic acid molecules on the surface of hybrid particles in addition to internal siRNA entrapment (see the table below). The formulations considered in this study were compared to the gold standard in gene silencing, Lipofectamine™ RNAiMAX, a commercially available lipid-based carrier specifically designed for siRNA delivery. Zeta-Sizer analysis of empty and siRNA-loaded Lipofectamine™ RNAiMAX also showed an increase in particle size and an inversion of surface charge from positive to negative values after complexation with nucleic acid.

Table showing characterization of particle properties

| Sample | | Particle size [nm] | Zeta potential [mV] |
| --- | --- | --- | --- |
| SIS005-PS91G | empty | 351 ± 32 | +36.6 ± 1.0 |
| | with siRNA | 462 ± 57 | −39.7 ± 0.6 |
| SIS005-DSC613G | empty | 361 ± 39 | +40.9 ± 0.9 |
| | with siRNA | 397 ± 44 | +34.9 ± 0.7 |
| RNAiMAX | empty | 133 ± 3 | +23.2 ± 12.0 |
| | with siRNA | 212 ± 32 | −57.0 ± 7.1 |

Measurements were undertaken in nuclease-free water. Data represent mean ± standard deviation (n = 3).

Measurements were undertaken in nuclease-free water. Data represent mean±standard deviation (n=3).

Evaluation of In Vitro siRNA Delivery to Corneal Cells

Figure 8:
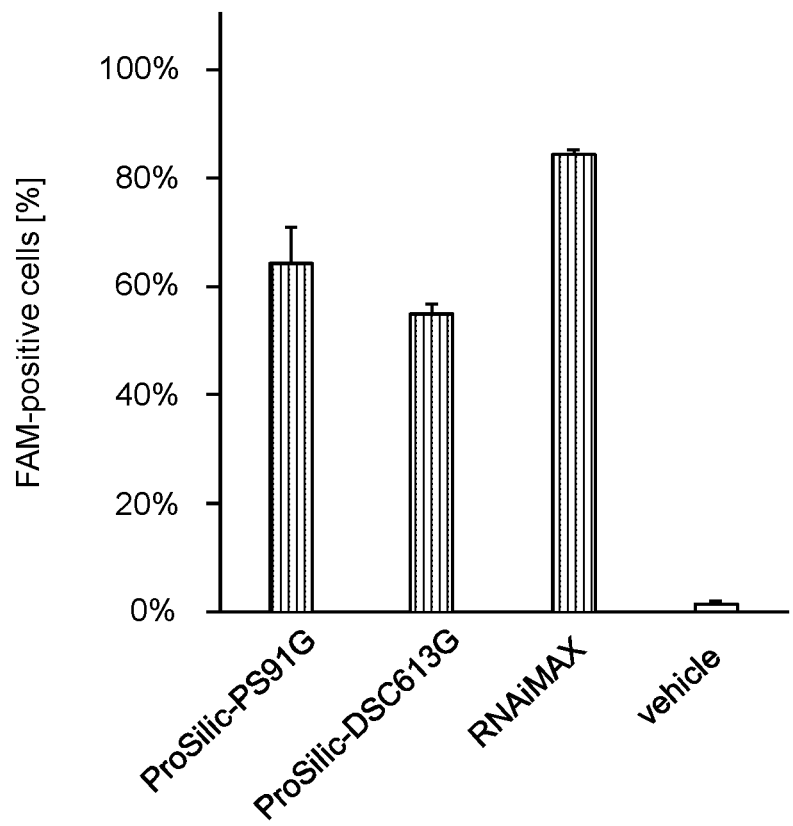
FIG. 8 shows the result of an experiment to determine the transfection efficiency of the silicon nanoparticle delivery system of the invention loaded with siRNA.

For initial in vitro screening, human corneal epithelial cell line (HCE-S) was used to evaluate the efficacy of the silicon nanoparticle delivery system of the invention in cellular transfection, along with its potential cytotoxicity. Transfection efficiency was quantified by flow cytometry analysis performed 24 hours after treatment with fluorescent oligonucleotide duplex loaded to carrier system, see FIG. 8. SIS005-DSC613G showed 55±2% and SIS005-PS91G showed 65±6% of FAM-positive cells, in comparison to 84±1% observed for the Lipofectamine™ RNAiMAX reagent.

Figure 9:
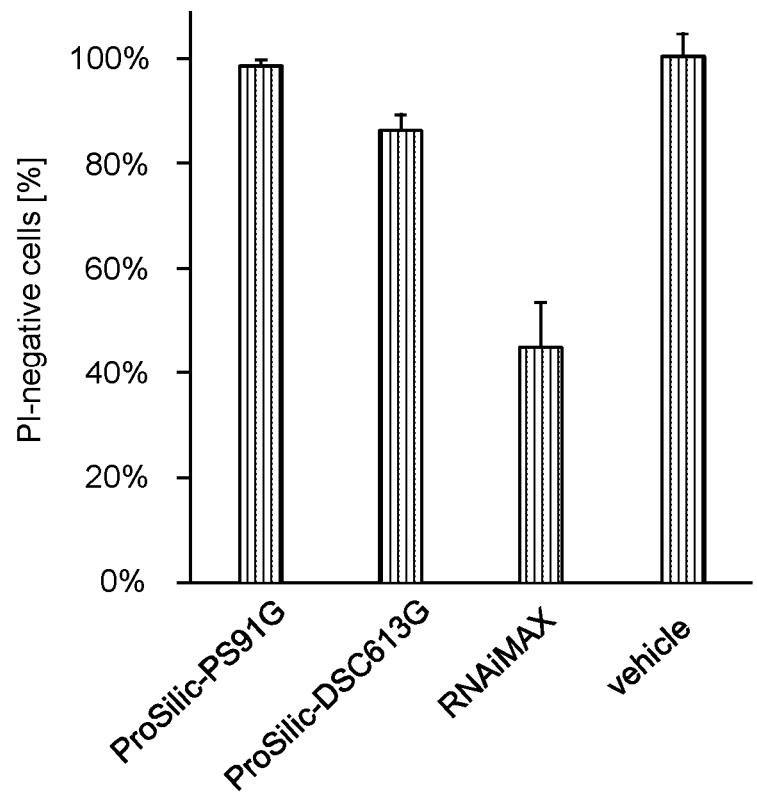
FIG. 9 shows the result of an experiment to determine the post-transfection viability of cells treated with the silicon nanoparticle delivery system of the invention loaded with siRNA.

The post-transfection cell viability was assessed based on live/dead staining with propidium iodide (PI), a common indicator of membrane disintegration. This showed that the silicon nanoparticle formulations were well tolerated by corneal epithelial cells in contrast to Lipofectamine™, see FIG. 9. Lipofectamine™, despite being highly effective for the delivery of exogenous nucleic acids into cells in vitro, is not suitable for clinical applications. Over 50% of cells transfected with Lipofectamine™ RNAiMAX were shown to have damaged membranes and internalized membrane impermeant PI dye whereas more than 86% and 98% intact cells were observed after treatment with the silicon nanoparticle formulations.

Figure 10:
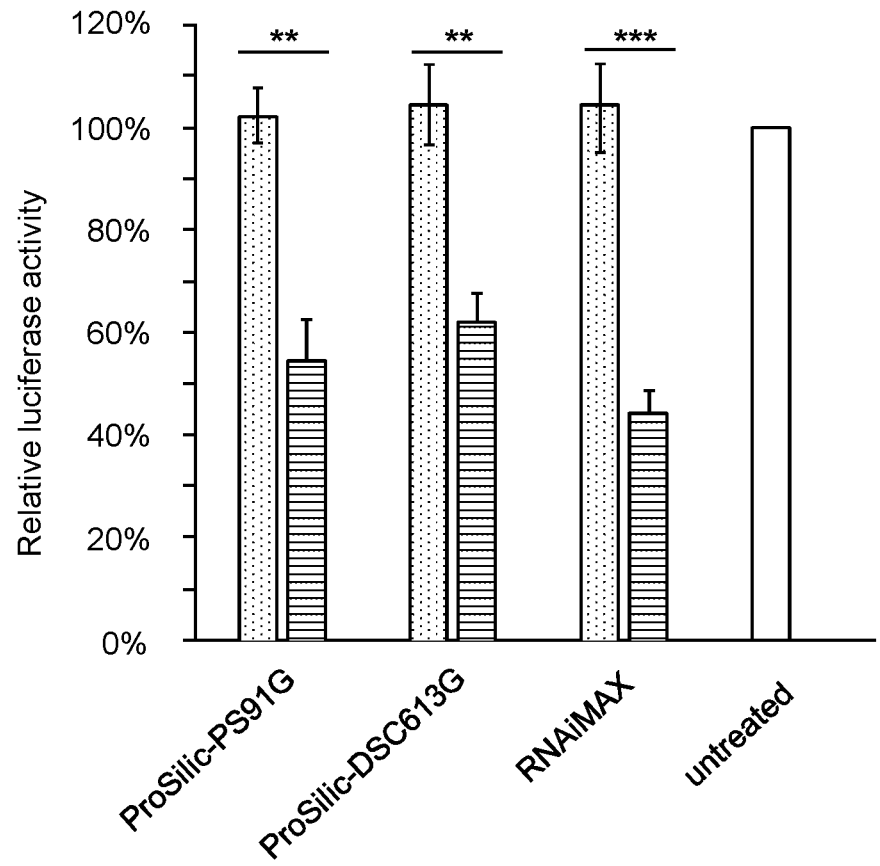
FIG. 10 shows the result of an experiment to determine the extent of siRNA-induced gene silencing when siRNA is delivered to cells using silicon nanoparticle delivery systems according to the present invention.

The bioavailability of siRNA was evaluated in gene expression studies using dual luciferase reporter assay. After treatment of HCE-S cells with 0.1 µM siLuc complexed with the silicon-based delivery system, a knockdown of 46±5% (p<0.01, siLuc vs NSC4 control) and 38±8% (p<0.01) was achieved for SIS005-PS91G and SIS005-DCS613G, respectively, whereas siLuc transfected with Lipofectamine™ RNAiMAX reduced luciferase reporter gene expression by 66±9% (p<0.001). See FIG. 10. Thus, the silicon nanoparticle delivery system demonstrated up to 70% of the potency of commercial siRNA transfection reagent while being safe and well-tolerated by the cells.

Figure 11:
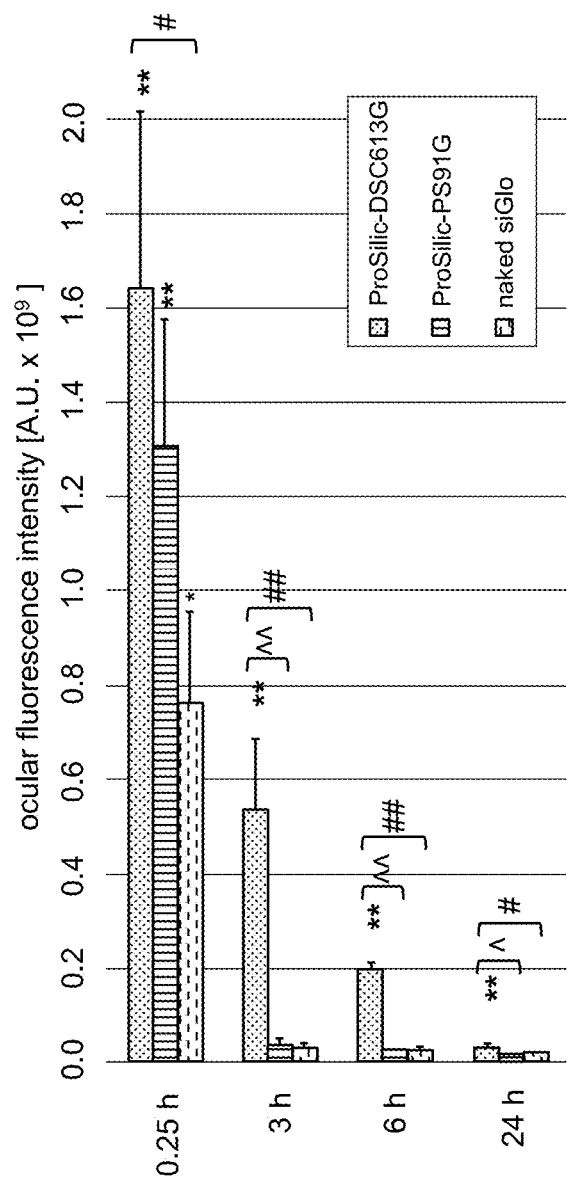
FIG. 11 shows the result of an experiment evaluating in vivo ocular siRNA delivery by topical silicon nanoparticle formulations.

Evaluation of In Vivo Ocular siRNA Delivery by Topical Silicon Nanoparticle Formulations Following the demonstration of successful siRNA delivery and gene knockdown in vitro, the two silicon nanoparticle formulations (SIS005-PS91G and SIS005-DCS613G) were evaluated in vivo for topical administration to the anterior eye. Firstly, SIS005-PS91G and SIS005-DCS613G were complexed with fluorescent siGlo and applied as an eye drop to wild-type mice following a unilateral procedure with the naked siGlo control being instilled in the opposite eye. The ocular fluorescence was monitored for up to 24 h using an in vivo imaging system. The first measurement was performed 15 min after administration when the mouse was still under anaesthesia after treatment, and the following measurements were repeated at 3, 6, and 24 h post-administration. Although an equal amount of siGlo was applied topically to each eye, the highest fluorescence intensity measured 15 min later was observed for the treatment with SIS005-DSC613G, subtly less for SIS005-PS91G, and two times less for naked siGlo ($p<0.05$), see FIG. 11. This indicated an increased ocular surface adhesion of formulated drug and an improved residence time for the two silicon nanoparticle formulations in comparison with the naked oligonucleotide. Three hours later, in vivo fluorescence signal decreased 3-fold in siGlo-SIS005-DSC613G-treated eyes, whereas it had returned to baseline levels for siGlo-SIS005-PS91G and unformulated siGlo eye drops due to active ocular clearance mechanisms. Although further gradual decrease of in vivo signal intensity was observed, fluorescence in the eyes treated with siGlo-SIS005-DSC613G persisted for up to 24 h and was significantly higher than in eyes treated with the unformulated naked siGlo at all the time points ($p<0.01$ at 3 h and 6 h, and $p<0.05$ at 24 h). This suggested an effective uptake of topically administered siRNA drug formulated with the silicon nanoparticles of the invention. To verify nanoparticle permeation into the tissue, distribution of the siRNA throughout the cornea layers was investigated by fluorescence microscopy of post-treatment corneal sections. Red siGlo fluorescence was detected throughout all corneal layers in all ProSilic-treated sections of eyes collected 3 hours after eye drops application, whereas no fluorescence above background was observed in the naked siGlo control. Twenty-four hours after the administration of siRNA formulations, the fluorescence was only observed in the cornea sections treated with SIS005-DSC613G.

Figure 12:
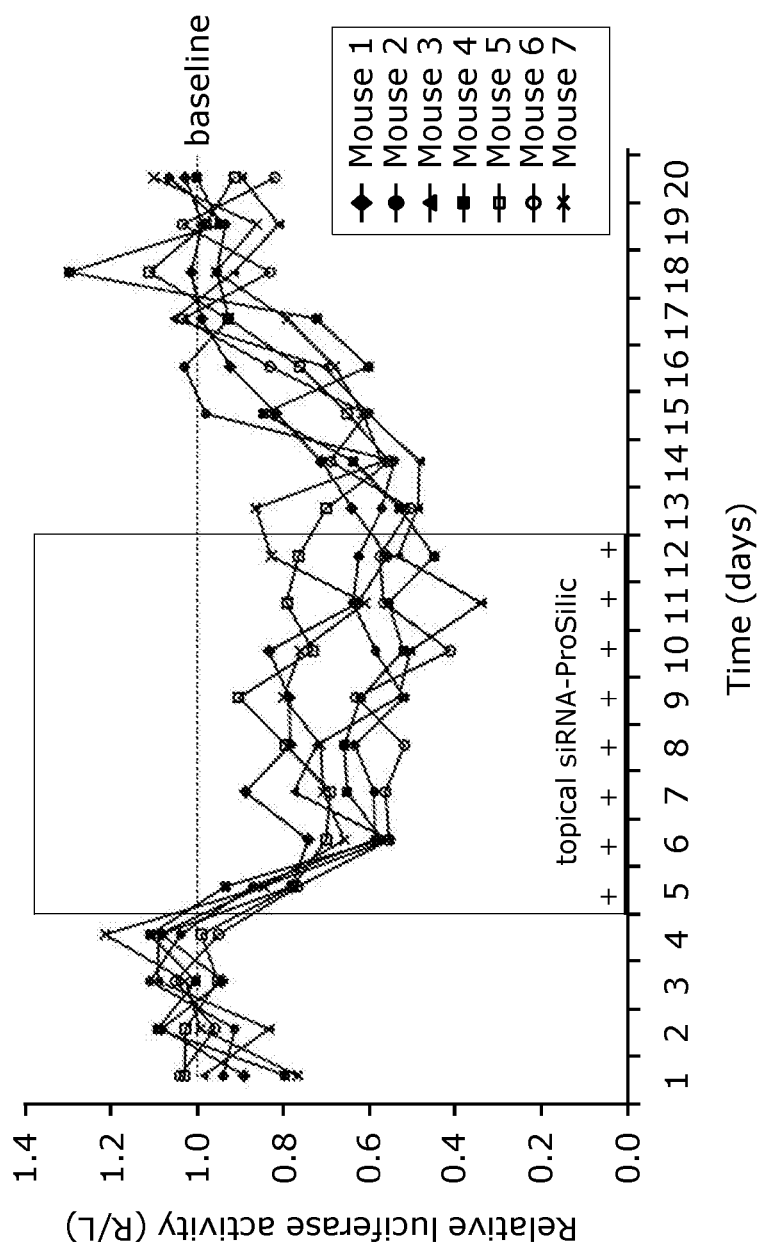
FIG. 12 shows the result of an experiment to determine murine corneal luciferase expression in vivo by live animal imaging, during treatment with the silicon nanoparticle delivery system of the invention loaded with siRNA.
Figure 13:
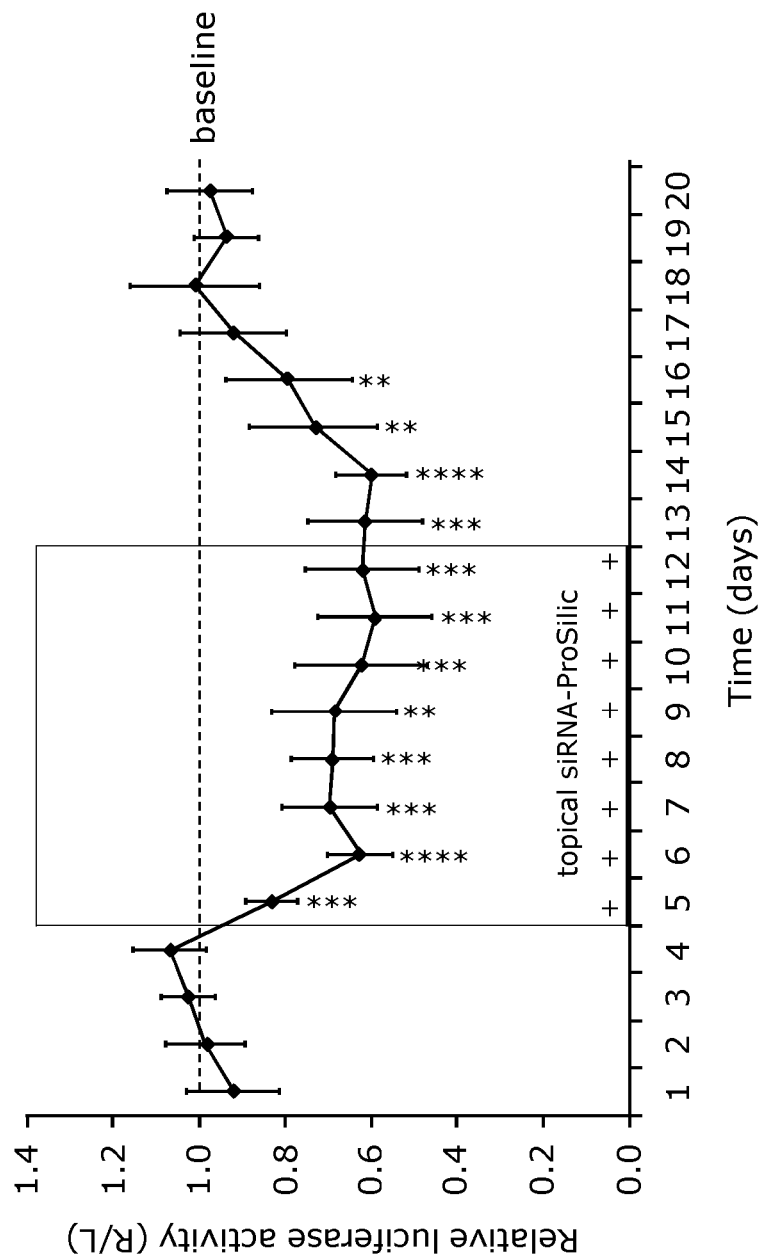

Following the in vivo uptake studies, siRNA delivery with SIS005-DSC613G was further investigated in functional assays using a murine reporter model with luciferase expression confined exclusively to the corneal epithelium. Prior to in vivo treatment, basal corneal luciferase activity in reporter mice was quantified every 24 h for 4 days to confirm a consistent right-to-left ratio for a split body control experiment. SIS005-DSC613G complexed with siLuc or control siRNA was applied topically as eye drops to opposite eyes of the same animal 8 times in daily intervals, and corneal luciferase expression was evaluated every day by live animal imaging throughout treatment regimen and over following 8 days. A reduced luciferase expression was observed within 24 h of treatment initiation, and a maximal inhibition (41%±13, $p<0.001$) was achieved at day 11. A significant gene silencing effect persisted throughout the entire treatment regimen and continued for 4 days after termination of treatment. As expected, the reduced ocular bioluminescence level gradually returned to baseline after treatment withdrawal which indicated a successful recovery from gene repression. See FIGS. 12 and 13 for these results. Importantly, gross examination of treated eyes and daily visual inspection of animals following topical treatment revealed no adverse effects from the eye drops, suggesting that the silicon nanoparticle formulation was well-tolerated in vivo.

The invention claimed is:

1. A composition for the controlled release and stabilization of a nucleic acid which is messenger RNA, comprising silicon nanoparticles which comprise at least 50% by weight silicon, wherein the silicon nanoparticles are surface treated with at least one transfection reagent and at least one amino acid, wherein the surface treated silicon nanoparticles are loaded with the messenger RNA, wherein the ratio of silicon to nucleic acid is from 2:1 to 8:1, wherein, upon administration to eukaryotic cells, the messenger RNA is transfected into the eukaryotic cells to achieve translation.

2. The composition according to claim 1, wherein the ratio of silicon to nucleic acid is from 2:1 to 3:1.

3. The composition according to claim 1, further comprising at least one disaccharide.

4. The composition according to claim 3, wherein the transfection reagent comprises a cationic lipid.

5. The composition according to claim 1, wherein the ratio of amino acid to silicon is from 0.05:1 to 2:1.

6. The composition according to claim 1, wherein the silicon nanoparticles have an average diameter of between 20 and 200 nm.

7. The composition according to claim 1, wherein the silicon nanoparticle is further surface treated with at least one lipid is selected from the group consisting of phosphatidylcholine, hydrogenated phosphatidylcholine, phosphatidylcholine derivatives, didecanoyl phosphatidylcholine, lecithin, phosphatidylethanolamine, 1,2-Dioleoyl-sn-glycero-3-phosphoethanolamine, and combinations thereof.

8. The composition according to claim 4, wherein the cationic lipid is selected from the group consisting of Cholesteryl N-(2-dimethylaminoethyl)carbamate, stearylamine, and combinations thereof.

9. The composition according to claim 4, wherein the cationic lipid is selected from the group consisting of Cholesteryl N-(2-dimethylaminoethyl)carbamate, stearylamine, and combinations thereof, and wherein the silicon nanoparticle is further surface treated with at least one lipid is selected from the group consisting of phosphatidylcholine, hydrogenated phosphatidylcholine, phosphatidylcholine derivatives, didecanoyl phosphatidylcholine, lecithin, phosphatidylethanolamine, 1,2-Dioleoyl-sn-glycero-3-phosphoethanolamine, and combinations thereof.

10. A composition according to claim 1, wherein the at least one amino acid is selected from arginine, glycine, histidine or combinations thereof.

11. A pharmaceutical composition for controlled release of messenger RNA, comprising the composition of claim 1.

12. A method comprising administering the composition of claim 1 to a subject.

13. The method of claim 12, wherein the composition is administered by ophthalmic delivery.

14. A method of preparing the composition of claim 1, comprising:
(a) providing silicon nanoparticles, wherein the silicon nanoparticles comprise at least 50% by weight silicon, wherein the silicon nanoparticles are surface treated with at least one transfection reagent, and further treated with at least one amino acid;
(b) providing messenger RNA; and
(c) loading the messenger RNA on the silicon nanoparticles.

* * * * *